(12) United States Patent
Yoshioka et al.

(10) Patent No.: US 12,315,682 B2
(45) Date of Patent: May 27, 2025

(54) PASSIVE COMPONENT AND PACKAGE COMPONENT

(71) Applicant: Murata Manufacturing Co., Ltd., Kyoto-fu (JP)

(72) Inventors: Yoshimasa Yoshioka, Nagaokakyo (JP); Kenji Toyoshima, Nagaokakyo (JP); Takaaki Mizuno, Nagaokakyo (JP); Toshiyuki Nakaiso, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 182 days.

(21) Appl. No.: 18/452,086

(22) Filed: Aug. 18, 2023

(65) Prior Publication Data

US 2024/0145175 A1    May 2, 2024

(30) Foreign Application Priority Data

Oct. 28, 2022    (JP) ................. 2022-173555

(51) Int. Cl.
*H01G 4/30*    (2006.01)
*H01F 17/00*    (2006.01)
(Continued)

(52) U.S. Cl.
CPC ........... *H01G 4/30* (2013.01); *H01F 17/0013* (2013.01); *H01F 27/022* (2013.01); *H01G 4/40* (2013.01)

(58) Field of Classification Search
CPC ............... H01F 17/0013; H01F 27/022; H01F 2017/0026; H01G 4/30; H01G 4/33;
(Continued)

(56) References Cited

U.S. PATENT DOCUMENTS

2017/0230026 A1*   8/2017   Okura .................. H01G 4/40
2019/0267330 A1*   8/2019   Takizawa ............. H01G 2/06

FOREIGN PATENT DOCUMENTS

JP     2003158097 A *   5/2003
JP     2009295928 A *   12/2009
(Continued)

OTHER PUBLICATIONS

Machine translation of Shimura Japanese Patent Document JP 2009-295928 A Dec. 2009 (Year: 2009).*

(Continued)

*Primary Examiner* — Kevin J Comber
(74) *Attorney, Agent, or Firm* — Studebaker Brackett PLLC

(57) ABSTRACT

A passive component includes an inorganic substrate having a first main surface and a second main surface, which are opposed to each other, and contains a semiconductor material; and a passive element portion on the first main surface of the inorganic substrate so as to be in contact with the first main surface. When a cross section in a plane that passes through a center of gravity in a whole of the first main surface and is orthogonal to the first main surface is defined as a first cross section, in the first cross section, the inorganic substrate has a first side surface and a second side surface, which are connected with the first main surface and opposed to each other, and each of line roughness of the first side surface and line roughness of the second side surface is larger than line roughness of the first main surface.

19 Claims, 19 Drawing Sheets

(51) Int. Cl.
　　　*H01F 27/02*　　　(2006.01)
　　　*H01G 4/40*　　　(2006.01)
(58) Field of Classification Search
　　　CPC ..... H01G 4/40; H01L 23/293; H01L 23/3121; H01L 23/481; H01L 23/5223; H01L 23/5227
　　　USPC ......................................................... 361/270
　　　See application file for complete search history.

(56)　　　　　　　　References Cited

FOREIGN PATENT DOCUMENTS

| | | |
|---|---|---|
| JP | 2017-139422 A | 8/2017 |
| JP | 2019-149467 A | 9/2019 |

OTHER PUBLICATIONS

Machine translation of Kume et al. Japanese Patent Document JP 2003-158097 A May 2003 (Year: 2003).*

* cited by examiner

PASSIVE COMPONENT AND PACKAGE COMPONENT

CROSS-REFERENCE TO RELATED APPLICATION

This application claims benefit of priority to Japanese Patent Application No. 2022-173555, filed Oct. 28, 2022, the entire content of which is incorporated herein by reference

BACKGROUND

Technical Field

The present disclosure relates to a passive component and a package component.

Background Art

In recent years, electronic components such as smartphones and personal computers have become more highly integrated along with miniaturization and performance improvement of the electronic components. In system in package (SiP) and the like, miniaturization is achieved by, for example, molding passive components together with semiconductor components with a sealing member. If an electronic component has a corner portion in molding of electronic components such as semiconductor components and passive components with a sealing member, there is concern that stress concentrates on the corner portion and accordingly peeling occurs between the sealing member and the electronic component or the electronic component deforms, for example.

Japanese Unexamined Patent Application Publication No. 2003-158097 discloses a conventional example of an electronic component. In this electronic component, a metal layer that is formed on a main surface of a substrate and a side surface metal layer that is formed from a side surface of the substrate to the main surface are connected with each other. An edge portion of the side surface, on which the side surface metal layer is formed, on the main surface side of the substrate is formed in an inclined manner. On the surface of the substrate, an FET structure serving as an element is provided.

SUMMARY

In conventional electronic components as the one described above, stress in molding is relieved by providing an edge portion on a side surface on a main surface side of a substrate. However, the provision of the edge portion reduces an area of the main surface of the substrate and accordingly reduces a region for providing elements, generating a concern about an influence on characteristics aspects.

Accordingly, the present disclosure provides a passive component and a package component that can relieve stress in molding and suppress performance degradation.

A passive component according to an aspect of the present disclosure includes an inorganic substrate that has a first main surface and a second main surface, which are opposed to each other, and contains a semiconductor material; and a passive element portion that is provided on the first main surface of the inorganic substrate so as to be in contact with the first main surface. When a cross section in a plane that passes through a center of gravity in a whole of the first main surface and is orthogonal to the first main surface is defined as a first cross section, in the first cross section, the inorganic substrate has a first side surface and a second side surface, which are connected with the first main surface and opposed to each other, and each of line roughness of the first side surface and line roughness of the second side surface is larger than line roughness of the first main surface.

Here, line roughness is equal to line edge roughness (LER).

According to the above-mentioned aspect, the line roughness of the first side surface and the line roughness of the second side surface are larger than the line roughness of the first main surface and therefore, when the passive component is molded with a sealing member, stress of the sealing member can be relieved by the line roughness of the first side surface and the line roughness of the second side surface and a close contact force between the sealing member and the first and second side surfaces can be enhanced.

Further, the line roughness of the first side surface and the line roughness of the second side surface are larger than the line roughness of the first main surface. Such roughening of the first and second side surfaces, on which a passive element portion is not provided, can secure the size of the first main surface, on which the passive element portion is provided, and suppress performance degradation of the passive element portion.

According to the passive component and the package component that are one aspect of the present disclosure, performance degradation can be suppressed while relieving stress in molding.

DETAILED DESCRIPTION

A passive component and a package component according to an aspect of the present disclosure will be described in detail below based on embodiments illustrated in the accompanying drawings. Here, some of the drawings are schematic and sometimes do not reflect actual dimensions or proportions.

First Embodiment

Outline Structure

Figure 1:
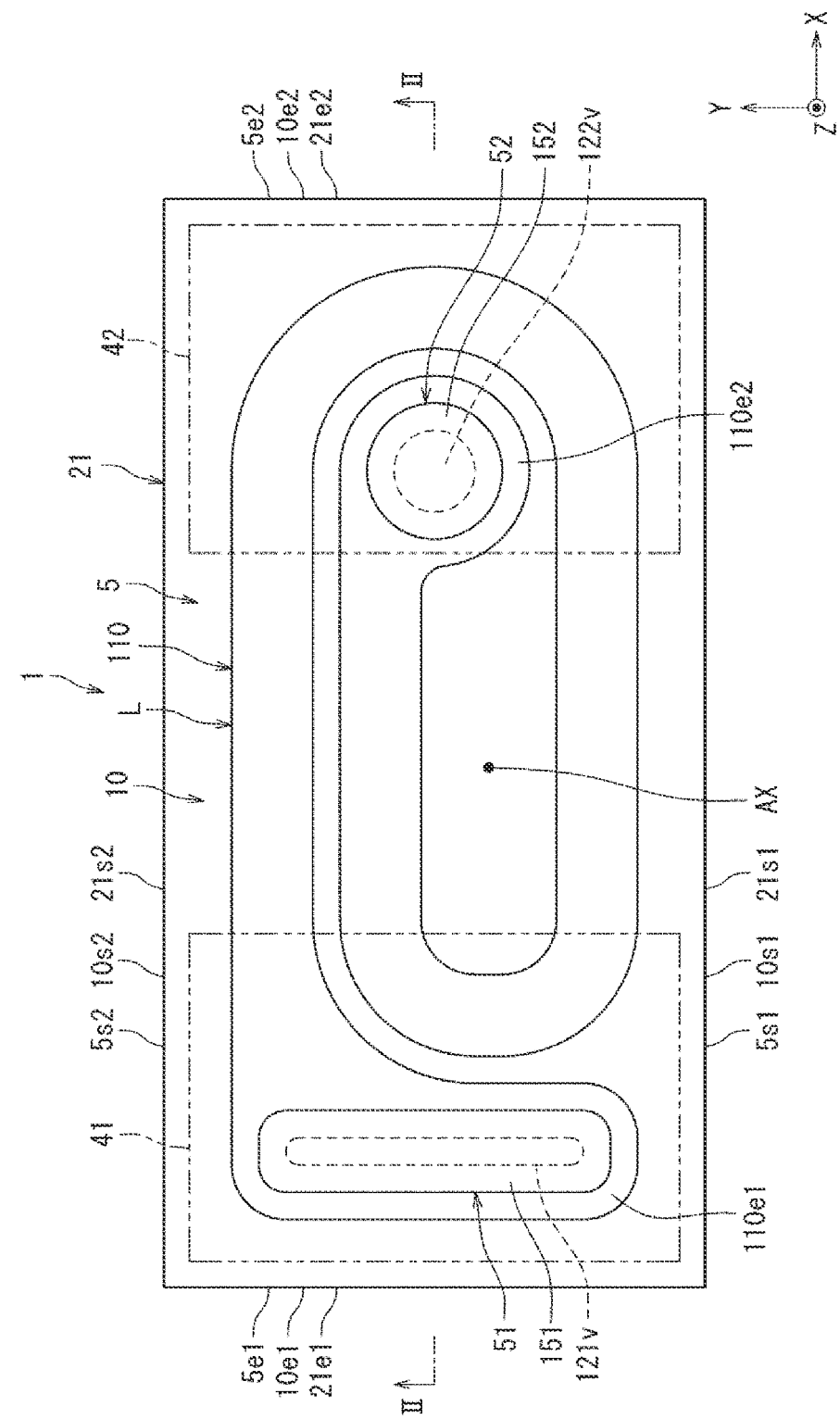
FIG. 1 is a schematic top view illustrating a passive component of a first embodiment viewed from a top surface side.
Figure 2:
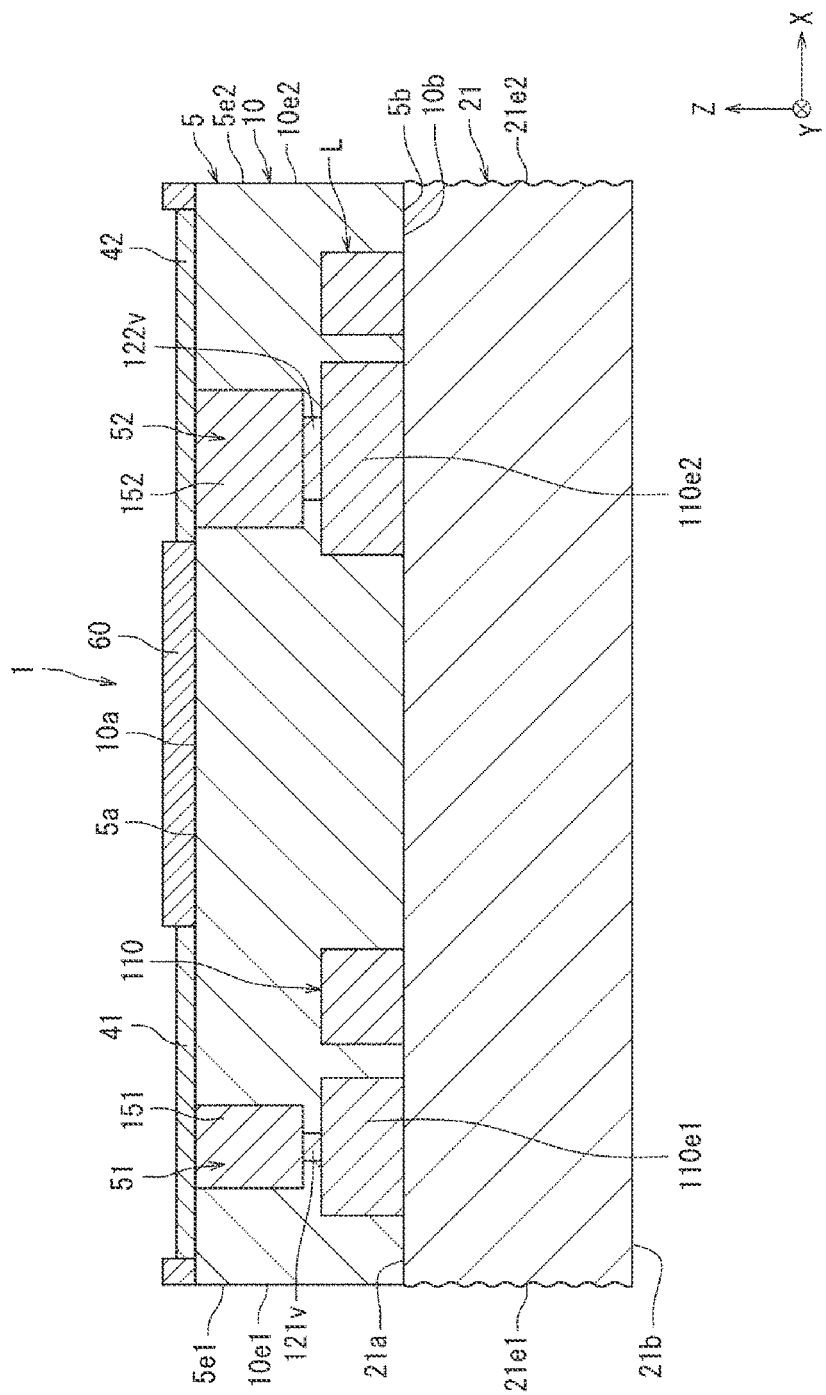
FIG. 2 is a sectional view taken along a II-II line of FIG. 1.

FIG. 1 is a schematic top view illustrating a passive component 1 viewed from a top surface side. FIG. 2 is a sectional view taken along a II-II line of FIG. 1. For convenience, a main body portion 10 is depicted as transparent in FIG. 1 so that the structure can be easily understood, but the main body portion 10 may be translucent or opaque. Further, FIG. 1 draws a first external terminal 41 and a second external terminal 42 with chain double-dashed lines and omits illustration of a coating film 60.

The outline structure of the passive component 1 will be described. The passive component 1 is, for example, a surface mount passive component that is used in a high frequency signal transmission circuit. The passive component 1 is an electronic component such as a resistor, a capacitor, and an inductor and does not include an active element such as a transistor.

As illustrated in FIGS. 1 and 2, the passive component 1 includes an inorganic substrate 21 and a passive element portion 5 that is provided on the inorganic substrate 21. The passive element portion 5 includes a passive element and the passive element is an inductor element L. The passive element is the inductor element L in this embodiment. However, the passive element may include one or more selected from the group consisting of inductor elements and capacitor elements, which increases the degree of freedom in circuit design. Here, the passive element may be a resistor.

The passive element portion 5 includes the passive element, but may include at least part of the passive element. For example, when the passive element is a capacitor element that includes a first capacitor electrode, a second capacitor electrode, and a dielectric film arranged between the first capacitor electrode and the second capacitor electrode, the passive element portion 5 may include part of a capacitor element which is composed of the second capacitor electrode and the dielectric film, without including the first capacitor electrode.

The inorganic substrate 21 has a top surface 21a and a bottom surface 21b that are opposed to each other. The top surface 21a corresponds to an example of a "first main surface" described in Claims and the bottom surface 21b corresponds to a "second main surface" described in Claims. The inorganic substrate 21 contains a semiconductor material. Examples of the semiconductor material include single semiconductors made of group IV elements such as Si, semiconductors made of group III or group V compounds such as GaAs, SiC, GaN, and InP, and oxide semiconductors such as SiO and ITO.

The inorganic substrate 21 has the length, the width, and the height. The inorganic substrate 21 has a first end surface 21e1 and a second end surface 21e2, which are on both respective end sides in the length direction, a first side surface 21s1 and a second side surface 21s2, which are on both respective end sides in the width direction, and the top surface 21a and the bottom surface 21b, which are on both respective end sides in the height direction. That is, the outer surface of the inorganic substrate 21 includes the first end surface 21e1 and the second end surface 21e2, the first side surface 21s1 and the second side surface 21s2, and the top surface 21a and the bottom surface 21b.

As illustrated in the drawings, the length direction (longitudinal direction) of the inorganic substrate 21 is hereinafter defined as the X direction, and the direction from the first end surface 21e1 to the second end surface 21e2 is referred to as the forward X direction, and the direction opposite to the forward X direction is referred to as the reverse X direction, for convenience of explanation. Further, the width direction of the inorganic substrate 21 is defined as the Y direction, and the direction from the first side surface 21s1 to the second side surface 21s2 is referred to as the forward Y direction, and the direction opposite to the forward Y direction is referred to as the reverse Y direction. Furthermore, the height direction of the inorganic substrate 21 is defined as the Z direction, and the direction from the bottom surface 21b to the top surface 21a is referred to as the forward Z direction, and the direction opposite to the forward Z direction is referred to as the reverse Z direction. In this specification, the forward Z direction is defined as the upper side and the reverse Z direction is defined as the lower side. The X direction, the Y direction, and the Z direction are orthogonal to each other, and when the X direction, the Y direction, and the Z direction are arranged in the order of X, Y, and Z, they constitute a right-handed system.

In this specification, "above the element" does not refer to one absolute direction, such as vertically upward as defined by the direction of gravity, but rather to the direction toward the outside, from the element, of the outside and inside with the element used as a boundary. Thus, "above the element"

is a relative direction determined by the orientation of the element. In addition, "above" with respect to an element includes not only the upper position away from the element, that is, the position above the element with other objects interposed therebetween or the position above the element with a space therebetween, but also the position directly above (on) the element, namely, the position in contact with the element.

The passive element portion 5 includes the main body portion 10 and the inductor element L that is provided in the main body portion 10. The passive element portion 5 is provided on the top surface 21a of the inorganic substrate 21 so as to be in contact with the top surface 21a.

As illustrated in FIG. 2, the inorganic substrate 21 has the first end surface 21e1 and the second end surface 21e2 that are connected with the top surface 21a and are opposed to each other, in a first cross section that is orthogonal to the top surface 21a. The first end surface 21e1 corresponds to a "first side surface" described in Claims and the second end surface 21e2 corresponds to a "second side surface" described in Claims. However, the first end surface 21e1 may correspond to the "second side surface" described in Claims and the second end surface 21e2 may correspond to the "first side surface" described in Claims.

The first cross section is a cross section in a plane that passes through the center of gravity in the whole of the top surface 21a and is orthogonal to the top surface 21a. In the present embodiment, the first cross section is a cross section that passes through the center of the passive component 1 in the Y direction which is the width direction. However, the first cross section may be a cross section that passes through the center of the passive component 1 in the X direction which is the length direction. In this structure, the first side surface 21s1 corresponds to the "first side surface" described in Claims and the second side surface 21s2 corresponds to the "second side surface" described in Claims, or the first side surface 21s1 may correspond to the "second side surface" described in Claims and the second side surface 21s2 may correspond to the "first side surface" described in Claims.

Each of line roughness of the first end surface 21e1 and line roughness of the second end surface 21e2 is larger than line roughness of the top surface 21a. Line roughness is equal to line edge roughness (LER). In other words, each of unevenness on the surface of the first end surface 21e1 and unevenness on the surface of the second end surface 21e2 is larger than unevenness on the surface of the top surface 21a. In FIG. 2, the unevenness on the surface of the first end surface 21e1 and the unevenness on the surface of the second end surface 21e2 are largely drawn for ease of understanding.

Figure 3A:
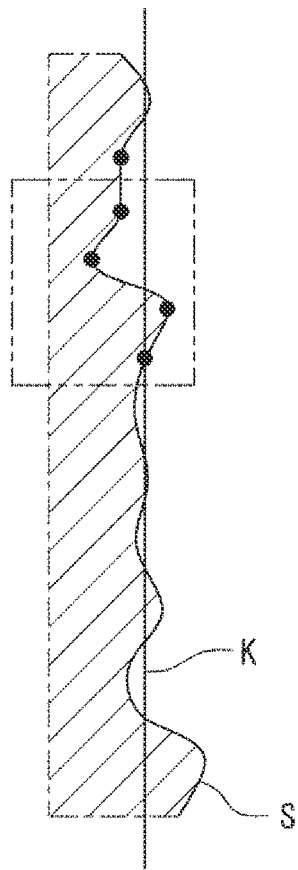
FIG. 3A is an explanation diagram for explaining a method for measuring line roughness.
Figure 3B:
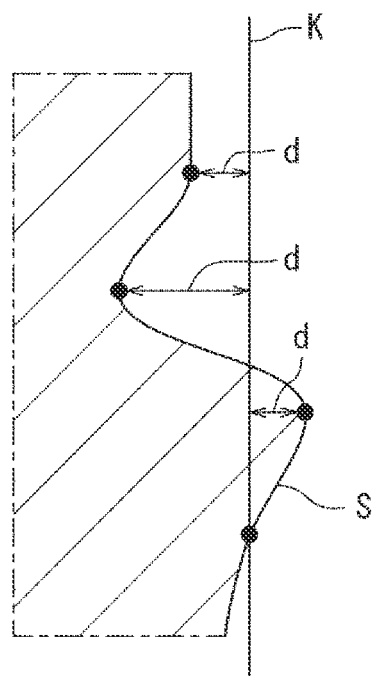
FIG. 3B is an enlarged view of FIG. 3A.

A method for measuring line roughness will be described here. As illustrated in FIG. 3A, an image of measurement points on a measurement plane S is acquired so as to detect edge points in measurement data. An approximate straight line K is calculated from the detected edge points by using the least-squares method. As illustrated in FIG. 3B, deviation amounts d between the approximate straight line K and the respective edge points are measured and an average value of the deviation amounts d in a predetermined range is defined as line roughness of the measurement plane S.

According to the above-mentioned structure, the line roughness of the first end surface 21e1 and the line roughness of the second end surface 21e2 are larger than the line roughness of the top surface 21a. Therefore, when the passive component 1 is molded with a sealing member, stress on the sealing member can be relieved by the line roughness of the first end surface 21e1 and the line roughness of the second end surface 21e2 and a close contact force between the sealing member and the first and second end surfaces 21e1 and 21e2 can be enhanced.

Further, the line roughness of the first end surface 21e1 and the line roughness of the second end surface 21e2 are larger than the line roughness of the top surface 21a. The roughening of the first and second end surfaces 21e1 and 21e2, on which the passive element portion 5 is not provided, can secure the size of the top surface 21a, on which the passive element portion 5 is provided, and suppress performance degradation of the passive element portion 5.

Furthermore, because of the large line roughness of the first end surface 21e1 and the line roughness of the second end surface 21e2, the first end surface 21e1 and the second end surface 21e2 are easily gripped and accordingly, the passive component 1 is easily picked up.

In addition, because of the small line roughness of the top surface 21a, the unevenness of the top surface 21a does not give any impact on formation of the passive element portion 5 on the top surface 21a, eliminating the need of an additional layer such as a planarization layer for absorbing the unevenness of the top surface 21a. Accordingly, the height of the passive component 1 can be reduced.

Preferable Structure of Each Member

The passive component 1 includes the inorganic substrate 21, the passive element portion 5 that is provided on the inorganic substrate 21, the first external terminal 41 and the second external terminal 42 that are provided on the passive element portion 5, and the coating film 60 that is provided on the passive element portion 5.

The thickness of the passive component 1 is preferably 200 μm or less. Thus, the passive component 1 can be formed thin. Examples of the size (length (X direction)× width (Y direction)×height (Z direction)) of the passive component 1 include 0.6 mm×0.3 mm×0.3 mm, 0.4 mm×0.2 mm×0.2 mm, and 0.25 mm×0.125 mm×0.120 mm. Here, the width and the height do not have to be substantially equal to each other and, for example, 0.4 mm×0.2 mm×0.3 mm may be employed.

The passive element portion 5 includes the main body portion 10 and the inductor element L that is provided in the main body portion 10. The inductor element L includes inductor wiring 110, and first extended wiring 51 and second extended wiring 52 that are connected with the inductor wiring 110.

The passive element portion 5 has a top surface 5a and a bottom surface 5b that are opposed to each other. The bottom surface 5b is in contact with the top surface 21a of the inorganic substrate 21. The bottom surface 5b corresponds to a "third main surface" described in Claims and the top surface 5a corresponds to an example of a "fourth main surface" described in Claims.

The passive element portion 5 has the length, the width, and the height. The passive element portion 5 has a first end surface 5e1 and a second end surface 5e2, which are on both respective end sides in the length direction, a first side surface 5s1 and a second side surface 5s2, which are on both respective end sides in the width direction, and the top surface 5a and the bottom surface 5b, which are on both respective end sides in the height direction. That is, the outer surface of the passive element portion 5 includes the first end surface 5e1 and the second end surface 5e2, the first side surface 5s1 and the second side surface 5s2, and the top surface 5a and the bottom surface 5b. The direction from the first end surface 5e1 to the second end surface 5e2 is the forward X direction, the direction from the first side surface 5s1 to the second side surface 5s2 is the forward Y direction, and the direction from the bottom surface 5b to the top surface 5a is the forward Z direction.

The main body portion 10 has the length, the width, and the height. The main body portion 10 has a first end surface 10e1 and a second end surface 10e2, which are on both respective end sides in the length direction, a first side surface 10s1 and a second side surface 10s2, which are on both respective end sides in the width direction, and a top surface 10a and a bottom surface 10b, which are on both respective end sides in the height direction. The top surface 5a of the passive element portion 5 includes the top surface 10a of the main body portion 10, the bottom surface 5b of the passive element portion 5 includes the bottom surface 10b of the main body portion 10, the first end surface 5e1 of the passive element portion 5 includes the first end surface 10e1 of the main body portion 10, the second end surface 5e2 of the passive element portion 5 includes the second end surface 10e2 of the main body portion 10, the first side surface 5s1 of the passive element portion 5 includes the first side surface 10s1 of the main body portion 10, and the second side surface 5s2 of the passive element portion 5 includes the second side surface 10s2 of the main body portion 10.

The main body portion 10 is made of organic resin. For example, the main body portion 10 may be made of resin such as epoxy-based or polyimide-based resin, which is easy to form. This increases the degree of freedom in the formation of the passive element portion 5. For example, the inductor wiring 110 which is thicker can be easily sealed in the main body portion 10. The main body portion 10 is composed of a single layer of member, but the main body portion 10 may be composed of two or more layers of members or may be made of two or more kinds of materials.

The inductor wiring 110 is provided on the top surface 21a of the inorganic substrate 21 and is formed in a planar spiral shape. The inductor wiring 110 is spirally wound in a clockwise direction from an outer circumferential end 110e1 to an inner circumferential end 110e2 when viewed in the Z direction. In other words, the inductor wiring 110 is extended in a direction parallel to the top surface 21a of the inorganic substrate 21 and is wound along the top surface 21a. The inductor wiring 110 has a central axis AX that is orthogonal to the top surface 21a of the inorganic substrate 21. According to this structure, the passive element portion 5 can be formed thinner than when the inductor wiring 110 has a central axis that is parallel to the top surface 21a of the inorganic substrate 21. As a result, the passive component 1 can be formed thinner.

The number of turns of the inductor wiring 110 preferably exceeds one. This can improve inductance. The outer circumferential end 110e1 is formed in a substantially rectangular shape. The inner circumferential end 110e2 is formed in a substantially circular shape. Each of the width in the X direction of the outer circumferential end 110e1 and the diameter of the inner circumferential end 110e2 is larger than the wiring width of a winding portion which is a portion of the inductor wiring 110 excluding the outer circumferential end 110e1 and the inner circumferential end 110e2. Accordingly, the outer circumferential end 110e1 and the inner circumferential end 110e2 function as pad portions and reliability of connection with the first extended wiring 51 and the second extended wiring 52 is improved.

The inductor wiring 110 is made of a good conductor material such as copper, silver, gold, or alloys of these. The inductor wiring 110 may be a metal film formed by plating, vapor deposition, sputtering, or the like, or may be a metal sintered body obtained by coating and sintering a conductive paste. Further, the inductor wiring 110 may have a multi-layer structure in which a plurality of metal layers are laminated. The thickness of the inductor wiring 110 is preferably from 5 µm to 50 µm inclusive.

The first extended wiring 51 and the second extended wiring 52 extend from both respective ends of the inductor wiring 110 in a direction orthogonal to the top surface 21a of the inorganic substrate 21, and penetrate through the main body portion 10. The first extended wiring 51 includes first via wiring 121v and first column wiring 151. The first via wiring 121v extends upward from the upper surface of the outer circumferential end 110e1 of the inductor wiring 110, and the first column wiring 151 extends upward from the first via wiring 121v. The second extended wiring 52 includes second via wiring 122v and second column wiring 152. The second via wiring 122v extends upward from the upper surface of the inner circumferential end 110e2 of the inductor wiring 110, and the second column wiring 152 extends upward from the second via wiring 122v.

The first extended wiring 51 and the second extended wiring 52 are not exposed from the first and second side surfaces 5s1 and 5s2, or the first and second end surfaces 5e1 and 5e2. Accordingly, when the first and second side surfaces 5s1 and 5s2 and the first and second end surfaces 5e1 and 5e2 are allowed to be exposed in a manufacturing process for singulation into each passive component 1, cutting into each passive component 1 can be easily performed without cutting the first extended wiring 51 and the second extended wiring 52.

The first external terminal 41 is provided on the top surface 5a of the passive element portion 5 (the top surface 10a of the main body portion 10) and covers the end surface of the first column wiring 151 exposed from the top surface 5a. Accordingly, the first external terminal 41 is electrically connected with the outer circumferential end 110e1 of the inductor wiring 110. The second external terminal 42 is provided on the top surface 5a of the passive element portion 5 and covers the end surface of the second column wiring 152 exposed from the top surface 5a. Accordingly, the second external terminal 42 is electrically connected with the inner circumferential end 110e2 of the inductor wiring 110.

The first external terminal 41 and the second external terminal 42 are made of a conductive material. The first external terminal 41 and the second external terminal 42 have, for example, a three-layer structure in which metal layers composed of Cu with low electrical resistance and excellent stress resistance, Ni with excellent corrosion resistance, and Au with excellent solder wettability and reliability are laminated in this order from an inner side portion to an outer side portion.

The coating film 60 is made of an insulating material. The coating film 60 covers the top surface 5a of the passive element portion 5 (the top surface 10a of the main body portion 10) and allows the first external terminal 41 and the second external terminal 42 to be exposed. The coating film 60 can ensure the insulation of the surface of the passive component 1. The coating film 60 is formed by, for example, solder resist. The coating film 60 may be made of the same material as that of the main body portion 10 or a different material from that of the main body portion 10.

As illustrated in FIG. 2, the passive element portion 5 has the first end surface 5e1 and the second end surface 5e2 that are connected with the top surface 5a and are opposed to each other, in a first cross section that is orthogonal to the top surface 21a of the inorganic substrate 21. The first end surface 5e1 corresponds to a "third side surface" described in Claims and the second end surface 5e2 corresponds to a "fourth side surface" described in Claims. The first cross section is a cross section in a plane that passes through the center of the top surface 21a of the inorganic substrate 21 and is orthogonal to the top surface 21a. In the present embodiment, the first cross section is a cross section that passes through the center of the passive component 1 in the Y direction which is the width direction. However, the first cross section may be a cross section that passes through the center of the passive component 1 in the X direction which is the length direction. In this structure, the first side surface 5s1 corresponds to the "third side surface" described in Claims and the second side surface 5s2 corresponds to the "fourth side surface" described in Claims.

It is preferable that the line roughness of the bottom surface 21b of the inorganic substrate 21 is smaller than the line roughness of the first end surface 21e1 of the inorganic substrate 21 and the line roughness of the second end surface 21e2 of the inorganic substrate 21 in the first cross section. The bottom surface 21b is thus free from unnecessary convexities, achieving thickness reduction of the passive component 1.

It is preferable that the line roughness of the first end surface 5e1 of the passive element portion 5 (the first end surface 10e1 of the main body portion 10) and the line roughness of the second end surface 5e2 of the passive element portion 5 (the second end surface 10e2 of the main body portion 10) are respectively smaller than the line roughness of the first end surface 21e1 of the inorganic substrate 21 and the line roughness of the second end surface 21e2 of the inorganic substrate 21 in the first cross section. For example, the smaller line roughness out of the line roughness of the first end surface 21e1 and the line roughness of the second end surface 21e2 of the inorganic substrate 21 is 0.48 µm, and the larger line roughness out of the line roughness of the first end surface 10e1 and the line roughness of the second end surface 10e2 of the main body portion 10 is 0.256 µm. Thus, the unevenness of the first end surface 10e1 and the unevenness of the second end surface 10e2 of the main body portion 10 can be reduced, accordingly being able to secure the size of the inductor wiring 110 in the width direction and secure the performance of the passive element portion 5.

It is preferable that the line roughness of the top surface 5a of the passive element portion 5 (the top surface 10a of the main body portion 10) is smaller than the line roughness of the first end surface 21e1 of the inorganic substrate 21 and the line roughness of the second end surface 21e2 of the inorganic substrate 21. The line roughness of the top surface 10a of the main body portion 10 is thus small, accordingly being able to suppress degradation of high frequency characteristics of an external terminal, wiring, and the like that are formed on the top surface 10a of the main body portion 10.

The line roughness of the top surface 21a of the inorganic substrate 21 is preferably 0.5 µm or less. Each of the line roughness of the first end surface 21e1 of the inorganic substrate 21 and the line roughness of the second end surface 21e2 of the inorganic substrate 21 is from 0.2 µm to 10 µm inclusive. Each of the line roughness of the first end surface 10e1 of the main body portion 10 and the line roughness of the second end surface 10e2 of the main body portion 10 is 0.5 µm or less. In this structure, as a premise, each of the line roughness of the first end surface 21e1 and the line roughness of the second end surface 21e2 is larger than the line roughness of the top surface 21a.

The line roughness of the top surface 21a of the inorganic substrate 21 is preferably larger than the line roughness of the bottom surface 21b of the inorganic substrate 21. The line roughness of the top surface 21a is thus large, accordingly being able to tighten close contact between the inorganic substrate 21 and the passive element portion 5.

The line roughness of the top surface 21a of the inorganic substrate 21 is preferably smaller than the line roughness of the bottom surface 21b of the inorganic substrate 21. The line roughness of the top surface 21a is thus small, accordingly being able to suppress degradation of high frequency characteristics of the passive element portion 5.

The main body portion 10 made of organic resin preferably has lower thickness than the thickness of the inorganic substrate 21. According to this structure, the main body portion 10 is made of organic resin and softer than the inorganic substrate 21, but the main body portion 10 is thinner, being able to suppress warpage of the passive component 1. Further, in mounting of the main body portion 10 on a mounting substrate, mounting shocks can be absorbed because the mounting surface is made of organic resin.

Manufacturing Method

A method for manufacturing the passive component 1 will next be described with reference to FIGS. 4A to 4J. FIGS. 4A to 4J are drawings corresponding to the II-II cross section of FIG. 1.

Figure 4A:
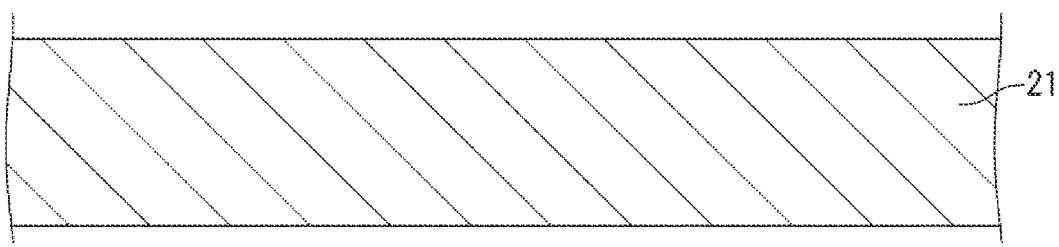
FIG. 4A is a schematic sectional view for explaining a method for manufacturing a passive component.

As illustrated in FIG. 4A, the inorganic substrate 21 is prepared. The inorganic substrate 21 is, for example, a Si substrate or a $SiO_2$ substrate.

Figure 4B:
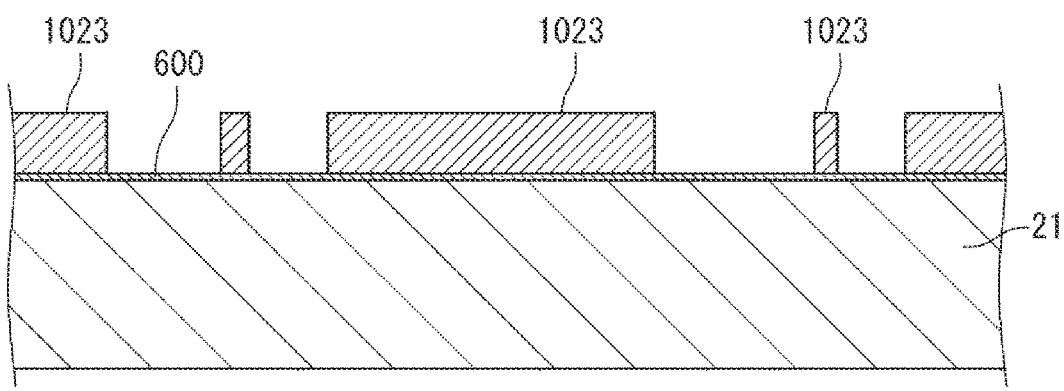
FIG. 4B is a schematic sectional view for explaining the method for manufacturing a passive component.

As illustrated in FIG. 4B, a seed layer 600 is formed on the upper surface (top surface) of the inorganic substrate 21 by using a sputtering method. Subsequently, a resist 1023 is bonded and a predetermined pattern is formed in the resist 1023 by using a photolithography method. The predetermined pattern is a pattern corresponding to the shape of the inductor wiring 110.

Figure 4C:
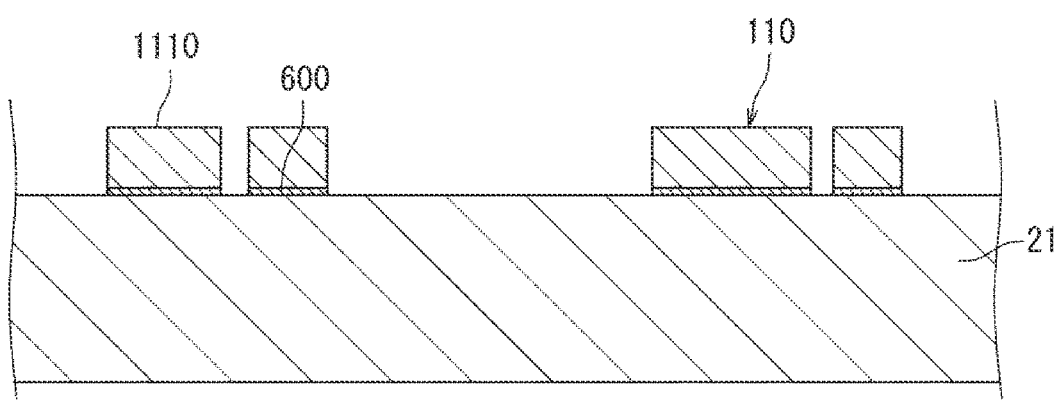
FIG. 4C is a schematic sectional view for explaining the method for manufacturing a passive component.

As illustrated in FIG. 4C, a conductor layer 1110 is formed on the seed layer 600 by using an electrolytic plating method while supplying power to the seed layer 600. The inductor wiring 110 is formed from the seed layer 600 and the conductor layer 1110. After that, the resist 1023 is peeled off and the exposed seed layer 600 is etched. The illustration of the seed layer 600 will be omitted hereinafter.

Figure 4D:
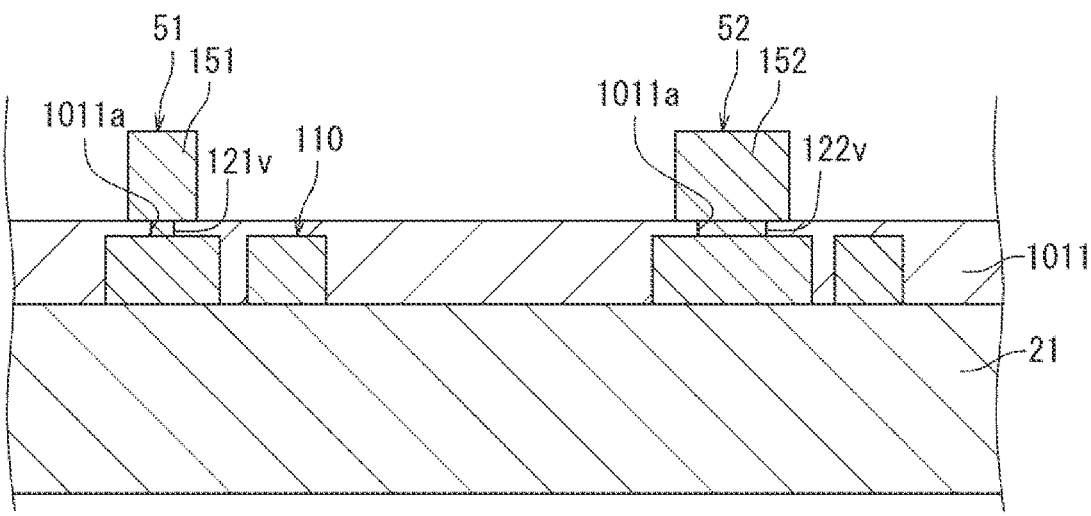
FIG. 4D is a schematic sectional view for explaining the method for manufacturing a passive component.

As illustrated in FIG. 4D, a first insulating layer 1011 is formed on the upper surface of the inorganic substrate 21 to cover the inductor wiring 110. Via holes 1011a are formed on positions, which correspond to respective end portions of the inductor wiring 110, on the upper surface of the first insulating layer 1011 by using the photolithography method. By the same method as that for forming the inductor wiring 110, a seed layer, which is not shown, is formed, then the first via wiring 121v and the second via wiring 122v are formed in the respective via holes 1011a, further the first column wiring 151 is formed on the first via wiring 121v, and the second column wiring 152 is formed on the second via wiring 122v. The first extended wiring 51 is formed from the first via wiring 121v and the first column wiring 151, and the second extended wiring 52 is formed from the second via wiring 122v and the second column wiring 152. Here, power may be supplied from the inductor wiring 110 without using the seed layer and extended wiring may be formed by an arbitrary method.

Figure 4E:
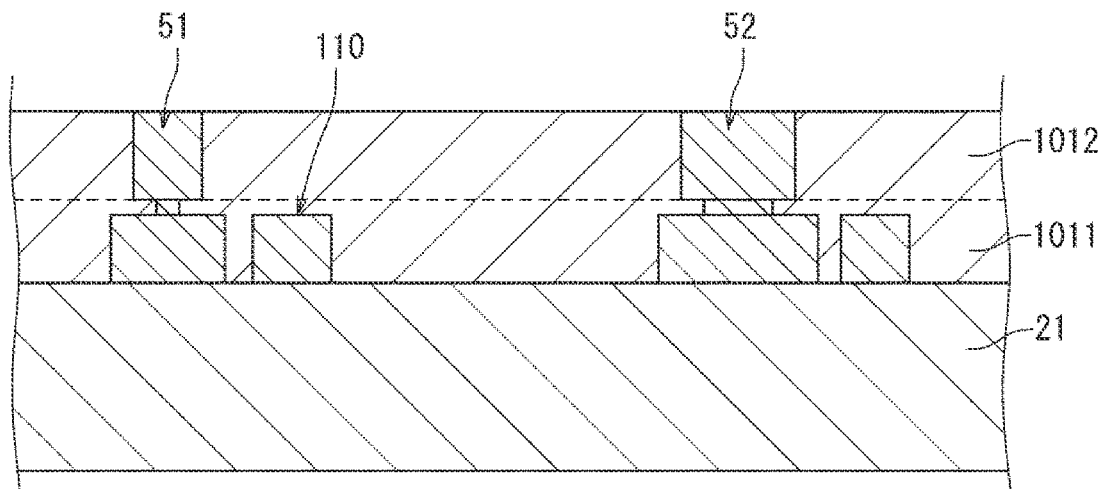
FIG. 4E is a schematic sectional view for explaining the method for manufacturing a passive component.

As illustrated in FIG. 4E, a second insulating layer 1012 is formed on the first insulating layer 1011 so as to cover the first extended wiring 51 and the second extended wiring 52, and the second insulating layer 1012 is ground so that the end surfaces of the first extended wiring 51 and the second extended wiring 52 are exposed. The main body portion 10 is formed from the first insulating layer 1011 and the second insulating layer 1012.

Figure 4F:
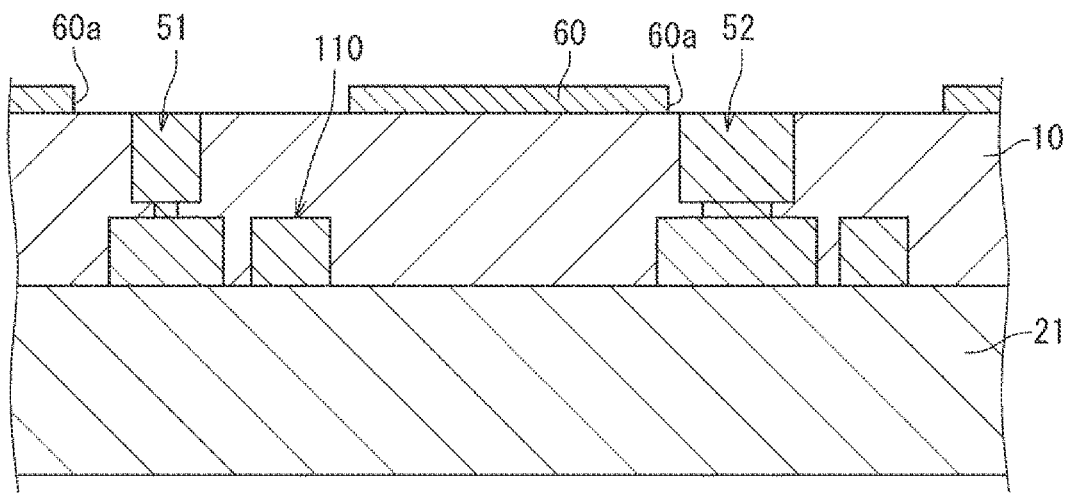
FIG. 4F is a schematic sectional view for explaining the method for manufacturing a passive component.

As illustrated in FIG. 4F, the coating film 60 is formed on the upper surface (top surface) of the main body portion 10. The coating film 60 is, for example, a solder resist. A hole portion 60a is formed in a region, on which an external terminal is to be formed, in the coating film 60.

Figure 4G:
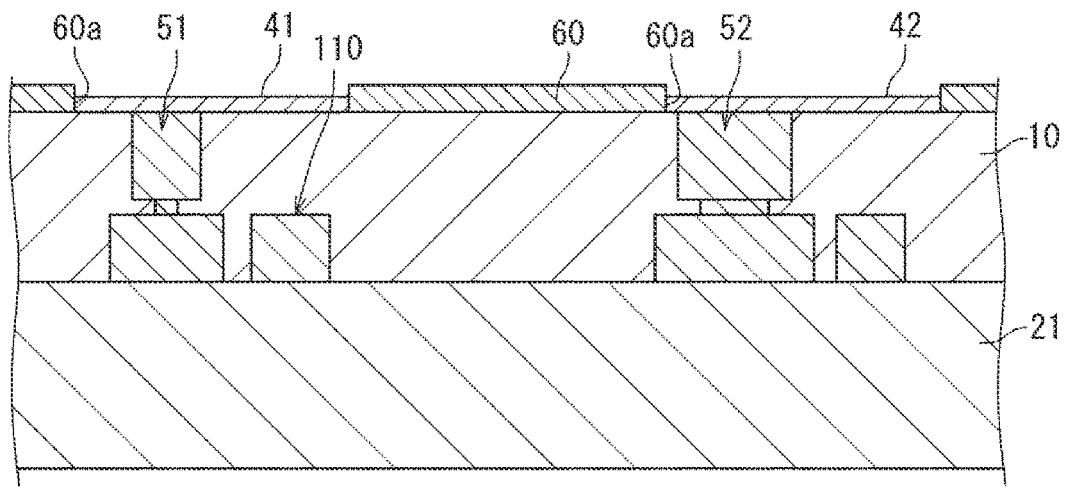
FIG. 4G is a schematic sectional view for explaining the method for manufacturing a passive component.

As illustrated in FIG. 4G, the first external terminal 41 is formed in the hole portion 60a on the first extended wiring 51 and the second external terminal 42 is formed in the hole portion 60a on the second extended wiring 52. The first external terminal 41 and the second external terminal 42 are formed by, for example, electroless plating or using a catalyst.

Figure 4H:
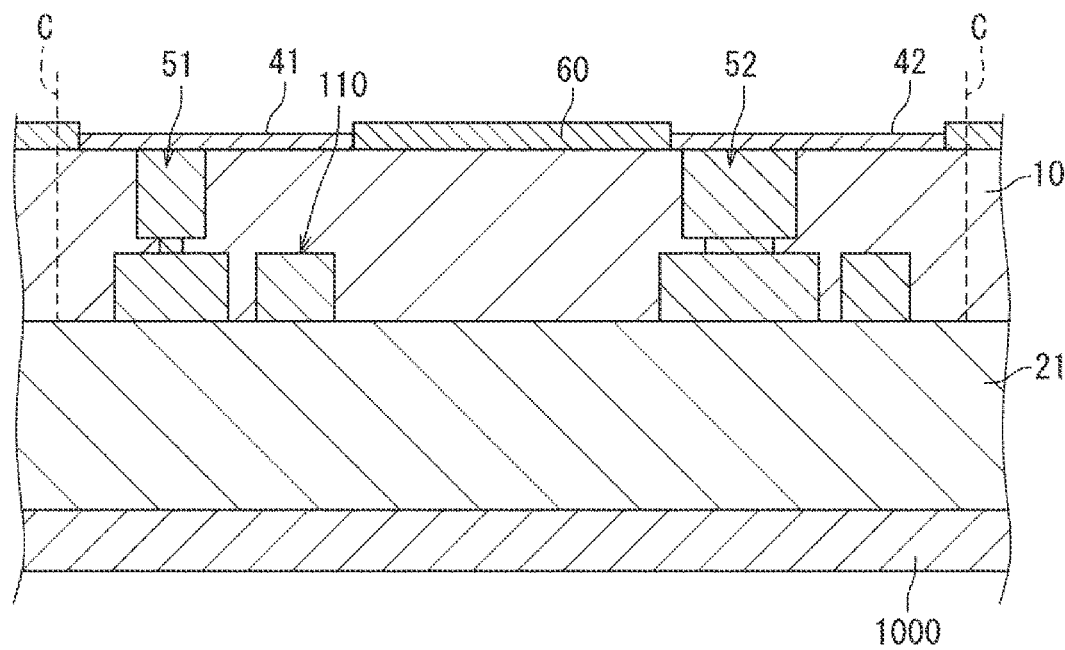
FIG. 4H is a schematic sectional view for explaining the method for manufacturing a passive component.
Figure 4I:
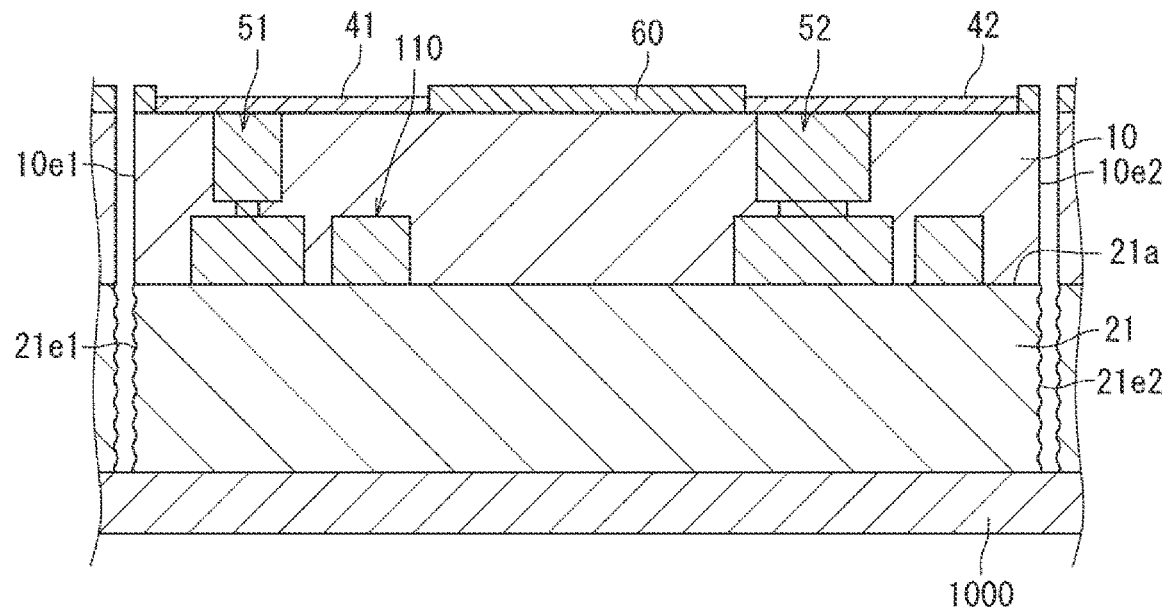
FIG. 4I is a schematic sectional view for explaining the method for manufacturing a passive component.

As illustrated in FIG. 4H, an adhesive member 1000 is attached to the lower surface (bottom surface) of the inorganic substrate 21 and the adhesive member 1000 is attached to a fixing table, which is not shown, so as to fix the inorganic substrate 21 to the fixing table. In the following singulation process, the main body portion 10 is first cut at a cutting line C with a blade, but the inorganic substrate 21 is not cut by the blade. The first end surface 10e1 and the second end surface 10e2 of the main body portion 10 are thus formed. Subsequently, etching is performed with respect to the inorganic substrate 21 without performing the etching with respect to the main body portion 10, as illustrated in FIG. 4I. The inorganic substrate 21 is thus etched by selective etching. The first end surface 21e1 and the second end surface 21e2 of the inorganic substrate 21 are thus formed.

This manufacturing method allows the line roughness of the first end surface 21e1 and the second end surface 21e2 of the inorganic substrate 21 to be larger than the line roughness of the first end surface 10e1 and the second end surface 10e2 of the main body portion 10 (the first end surface 5e1 and the second end surface 5e2 of the passive element portion 5). In a similar manner, this method allows the line roughness of the first end surface 21e1 and the second end surface 21e2 of the inorganic substrate 21 to be larger than that of the top surface 21a of the inorganic substrate 21. Further, desired line roughness of the first end surface 21e1 and the second end surface 21e2 of the inorganic substrate 21 can be obtained by optimizing abrasive grains on the side surface of the blade or grinding the first end surface 21e1 and the second end surface 21e2 of the inorganic substrate 21 while vibrating the blade.

Figure 4J:
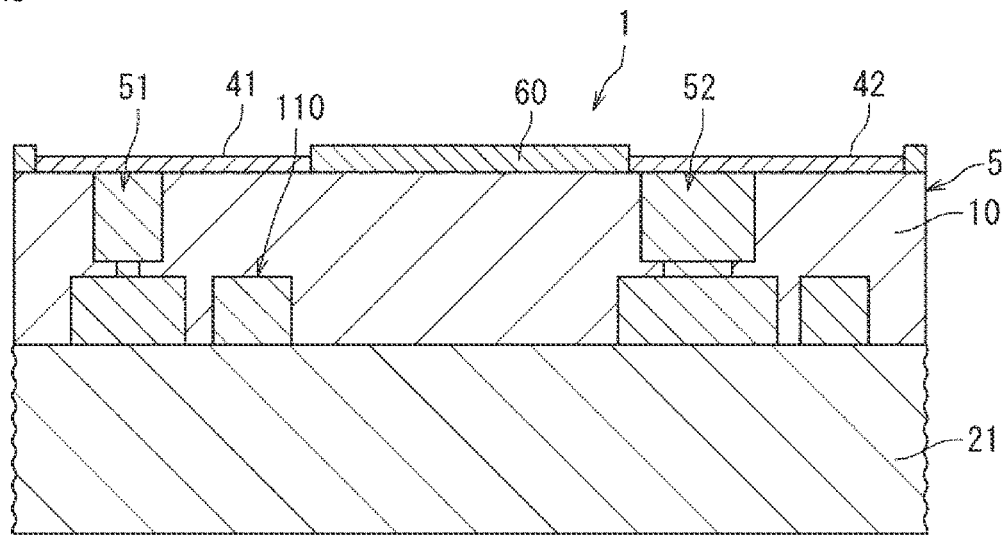
FIG. 4J is a schematic sectional view for explaining the method for manufacturing a passive component.

The adhesive member 1000 is peeled off and thus, the passive component 1 is manufactured, as illustrated in FIG. 4J.

Second Embodiment

Structure

Figure 5:
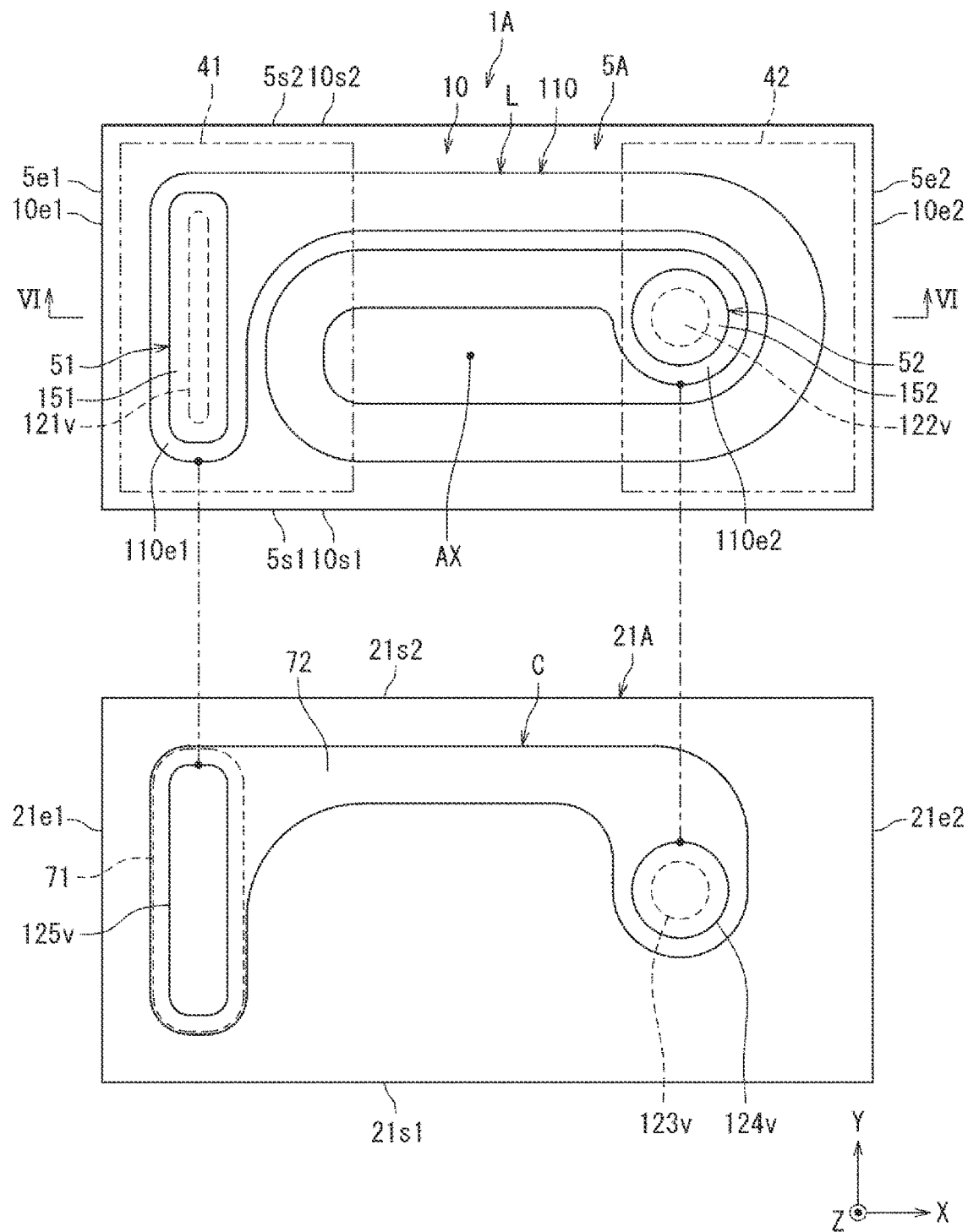
FIG. 5 is an exploded plan view illustrating a passive component of a second embodiment viewed from a top surface side.
Figure 6:
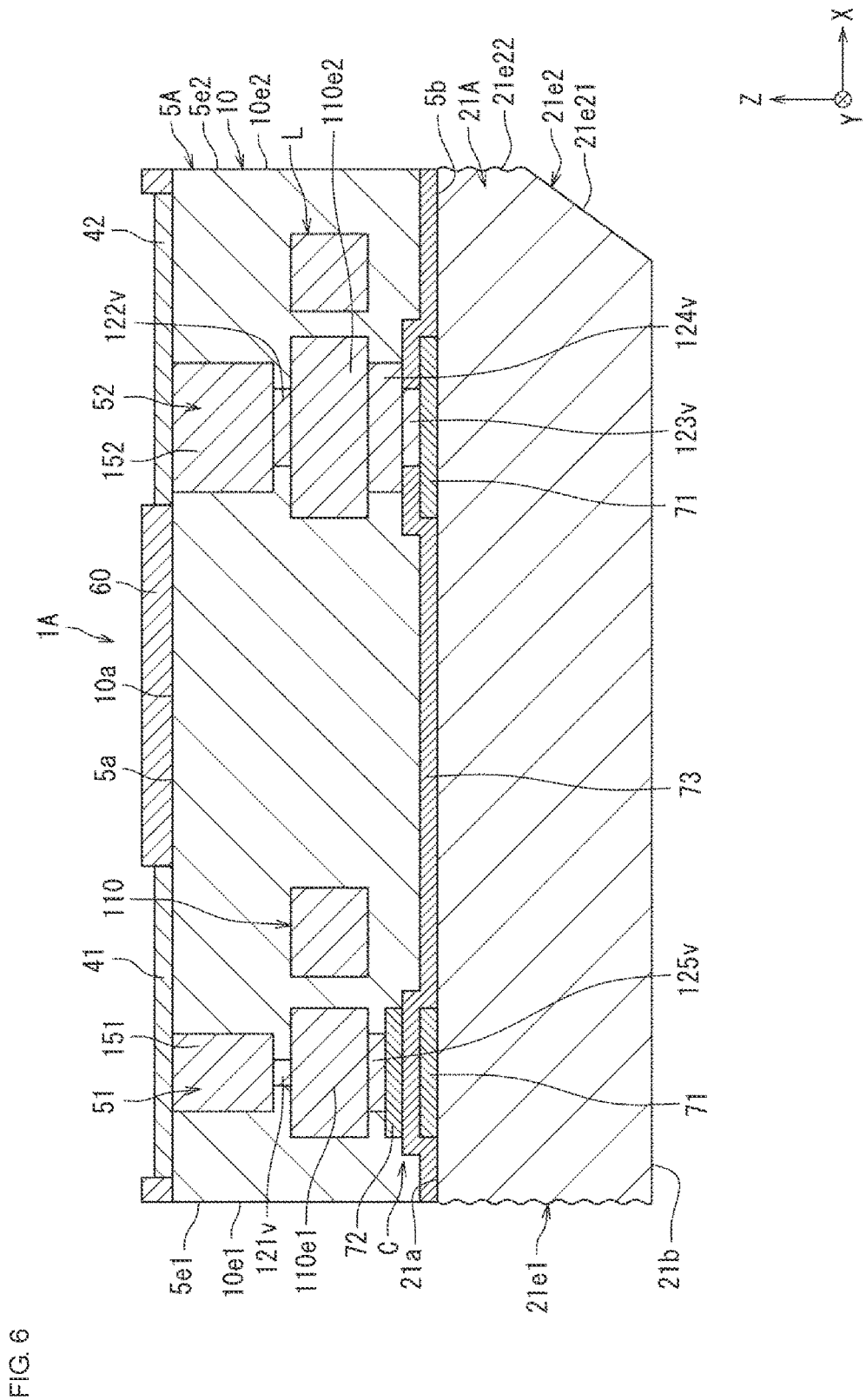
FIG. 6 is a sectional view taken along a VI-VI line of FIG. 5.

FIG. 5 is an exploded plan view illustrating a passive component of a second embodiment. FIG. 6 is a sectional view taken along a VI-VI line of FIG. 5. The second embodiment is mainly different from the first embodiment in a structure of a passive element portion and a shape of an inorganic substrate. The different structures will be described below. Other structures are the same as the structures of the first embodiment and will be provided with the same reference characters as those of the first embodiment and the description thereof will be omitted.

For convenience, the main body portion 10 is depicted as transparent in FIG. 5 so that the structure can be easily understood, but the main body portion 10 may be translucent or opaque. Further, FIG. 5 draws the first external terminal 41 and the second external terminal 42 with chain double-dashed lines and omits illustration of the coating film 60 and a dielectric film 73.

As illustrated in FIGS. 5 and 6, in a passive component 1A of the second embodiment, a passive element portion 5A includes a capacitor element C and an inductor element L that are provided in the main body portion 10. The inductor element L and the capacitor element C are electrically connected in parallel. The capacitor element C is provided on the top surface 21a of an inorganic substrate 21A and the inductor element L is provided above the capacitor element C.

According to the above-mentioned structure, the capacitor element C and the inductor element L are provided on the inorganic substrate 21A in this order. Therefore, the inductor element L can be formed above the capacitor element C after the capacitor element C is formed on the inorganic substrate 21A in a process for manufacturing the passive component 1A. Thus, the inductor element L is formed last and therefore, a heat-sensitive material can be used for the inductor element L. Further, since the capacitor element C is not in the inorganic substrate 21A, the inorganic substrate 21A can be ground in arbitrary thickness.

The capacitor element C includes a first capacitor electrode 71 and a second capacitor electrode 72 that are opposed to each other in a direction orthogonal to the top surface 21a of the inorganic substrate 21A, and the dielectric film 73, which is interposed between the first capacitor electrode 71 and the second capacitor electrode 72.

Each of the first capacitor electrode 71 and the second capacitor electrode 72 extends in a direction parallel to the top surface 21a of the inorganic substrate 21A. The first capacitor electrode 71 is in contact with the top surface 21a of the inorganic substrate 21A. The second capacitor electrode 72 is arranged above the first capacitor electrode 71.

The first capacitor electrode 71 is formed so that the first capacitor electrode 71 overlaps with the outer circumferential end 110e1, and the inner circumferential end 110e2, and part of the winding portion of the inductor wiring 110 when viewed in the Z direction. That is, the first end portion of the first capacitor electrode 71 overlaps with the outer circumferential end 110e1, the second end portion of the first capacitor electrode 71 overlaps with the inner circumferential end 110e2, and a portion between the first end portion and the second end portion of the first capacitor electrode 71 overlaps with part of the winding portion when viewed in the Z direction.

The second capacitor electrode 72 is formed so that the second capacitor electrode 72 overlaps with the outer circumferential end 110e1 of the inductor wiring 110 when viewed in the Z direction. That is, the second capacitor electrode 72 overlaps with the first end portion of the first capacitor electrode 71 when viewed in the Z direction.

The dielectric film 73 is arranged between the second capacitor electrode 72 and the inorganic substrate 21A. The dielectric film 73 is in contact with the top surface 21a of the inorganic substrate 21A in a manner to cover the first capacitor electrode 71. The bottom surface 5b of the passive element portion 5A includes the dielectric film 73 and the first capacitor electrode 71.

The second end portion of the first capacitor electrode 71 is connected with third via wiring 123v, which penetrates through the dielectric film 73, and the third via wiring 123v is connected with the inner circumferential end 110e2 of the inductor wiring 110 via fourth via wiring 124v. The second capacitor electrode 72 is connected with the outer circumferential end 110e1 of the inductor wiring 110 via fifth via wiring 125v. Accordingly, the inductor element L and the capacitor element C are electrically connected in parallel as illustrated by the dashed-dotted line in FIG. 5. However, the inductor element L and the capacitor element C may be electrically connected in series.

The conductive material for the first capacitor electrode 71 and the second capacitor electrode 72 is not especially limited and is, for example, Al. The conductive material for the first capacitor electrode 71 and the second capacitor electrode 72 is preferably different from the conductive material of the inductor wiring 110. Manufacturing cost can be reduced without degrading characteristics of the passive component 1A by the use of different conductive materials with respect to the first and second capacitor electrodes 71 and 72, through which direct current does not flow, and with respect to the inductor wiring 110, through which direct current flows. Specifically stating, Al has low conductivity but is inexpensive. Therefore, Al is preferably used for the first and second capacitor electrodes 71 and 72 of the capacitor element C, which is a voltage element. In addition, Cu having high conductivity is preferably used for the inductor wiring 110 of the inductor element L, which is a current element. Accordingly, the manufacturing cost can be reduced without degrading the characteristics of the passive component 1A.

The dielectric film 73 contains at least one chemical element of the inorganic substrate 21A. The material of the inorganic substrate 21A is the same as the material of the inorganic substrate 21 of the first embodiment. The material of the dielectric film 73 is, for example, $SiO_2$. This makes it easier to bring physical parameters (coefficient of linear expansion and Young's modulus) of the dielectric film 73 to physical parameters of the inorganic substrate 21A, thereby being able to suppress warpage of the dielectric film 73. Examples of the material of the dielectric film 73 may include any high-k materials such as $HfO_2$ and $Y_2O_3$. This can increase the capacitance of the capacitor element C.

As illustrated in FIG. 6, the line roughness of the first end surface 21e1 of the inorganic substrate 21A and the line roughness of the second end surface 21e2 of the inorganic substrate 21A are different from each other in the first cross section, which is orthogonal to the top surface 21a of the inorganic substrate 21A. For example, the difference between the line roughness of the first end surface 21e1 and the line roughness of the second end surface 21e2 is three times or greater. This can impart directionality to the inorganic substrate 21A. The line roughness of the first end surface 21e1 is smaller than the line roughness of the second end surface 21e2 in the second embodiment.

Specifically stated, the second end surface 21e2 has an inclined surface 21e21, which is inclined in a direction orthogonal to the top surface 21a and connected with the bottom surface 21b, on a portion thereof. That is, the second end surface 21e2 further has a vertical surface 21e22, which extends in the direction orthogonal to the top surface 21a and connected with the top surface 21a, and the inclined surface 21e21 is connected between the vertical surface 21e22 and the bottom surface 21b. On the other hand, the first end surface 21e1 is a vertical surface, which extends in the direction orthogonal to the top surface 21a. This structure can more clearly impart directionality to the inorganic substrate 21A.

Each of the line roughness of the first end surface 21e1 and the line roughness of the second end surface 21e2 is larger than the line roughness of the top surface 21a, as is the case with the first embodiment. The line roughness of the second end surface 21e2 is measured based on not only the unevenness on the surface of the vertical surface 21e22 and the unevenness on the surface of the inclined surface 21e21 but also an inclination angle of the inclined surface 21e21. Each of the unevenness on the surface of the first end surface 21e1 and the unevenness on the surface of the vertical surface 21e22 of the second end surface 21e2 is larger than the unevenness on the surface of the inclined surface 21e21 of the second end surface 21e2. In FIG. 6, the unevenness on the surface of the first end surface 21e1 and the unevenness on the surface of the vertical surface 21e22 of the second end surface 21e2 are largely drawn for ease of understanding.

The inclined surface 21e21 is formed so as to be inclined from the top surface 21a to the bottom surface 21b in a direction approaching the first end surface 21e1. According to the above-mentioned structure, a corner portion on the bottom surface 21b side of the inorganic substrate 21A is chamfered and chipping of the inorganic substrate 21A can be prevented.

Here, the second end surface 21e2 has the inclined surface, but the first end surface 21e1 may have an inclined surface or the first end surface 21e1 and the second end surface 21e2 may have inclined surfaces. That is, at least one of the first end surface 21e1 and the second end surface 21e2 may have an inclined surface.

Manufacturing Method

A method for manufacturing the passive component 1A will next be described with reference to FIGS. 7A to 7L. FIGS. 7A to 7L are drawings corresponding to the VI-VI cross section of FIG. 5.

Figure 7A:
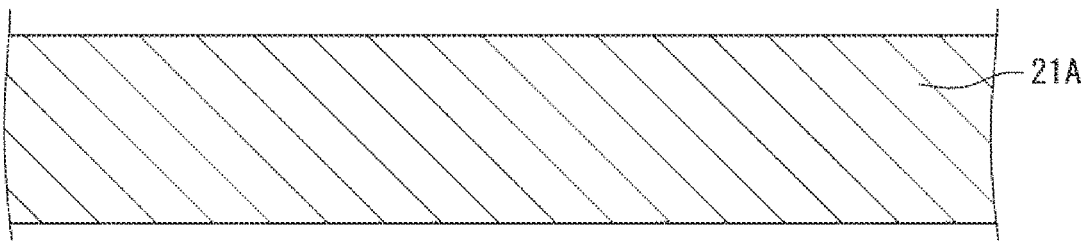
FIG. 7A is a schematic sectional view for explaining a method for manufacturing a passive component.

As illustrated in FIG. 7A, the inorganic substrate 21A is prepared. The inorganic substrate 21A is, for example, a Si substrate or a $SiO_2$ substrate.

Figure 7B:
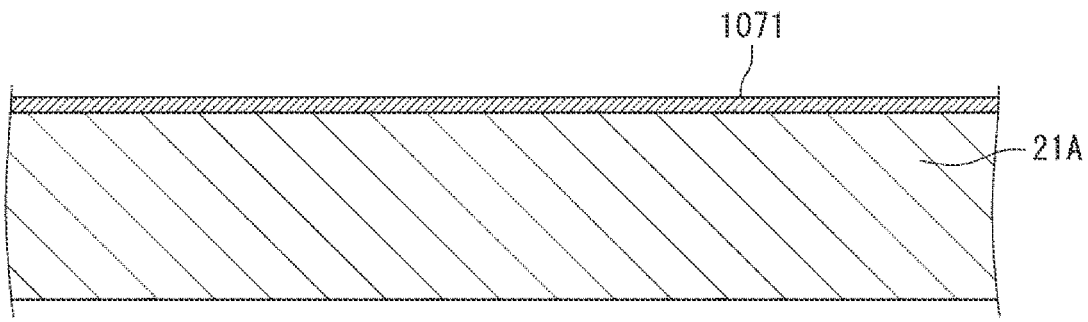
FIG. 7B is a schematic sectional view for explaining the method for manufacturing a passive component.

As illustrated in FIG. 7B, a first capacitor electrode conductor layer 1071 corresponding to the first capacitor electrode 71 is formed on the inorganic substrate 21A. Specifically stated, for example, an Al film is formed on an upper surface of the inorganic substrate 21A by using the sputtering method.

Figure 7C:
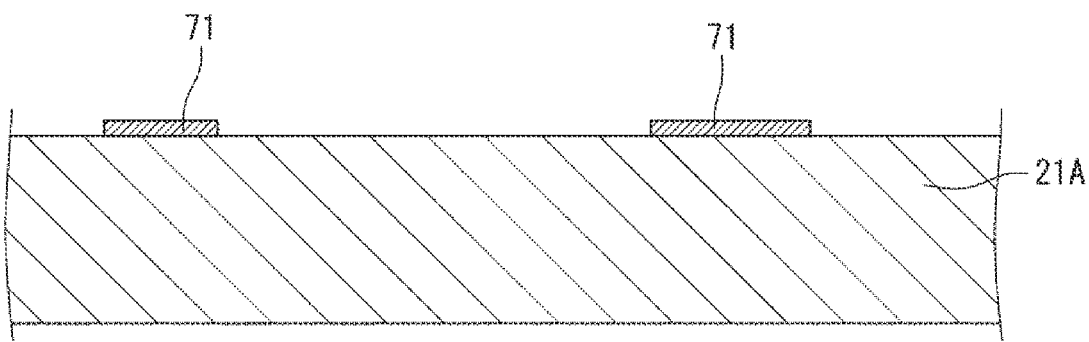
FIG. 7C is a schematic sectional view for explaining the method for manufacturing a passive component.

As illustrated in FIG. 7C, a resist layer, which is not shown, is applied and a predetermined pattern of cavities is formed in the resist layer by the photolithography process. After that, the Al film is etched so as to form the first capacitor electrode conductor layer 1071 that is patterned. The resist layer is then peeled off. The first capacitor electrode 71 is thus formed.

Figure 7D:
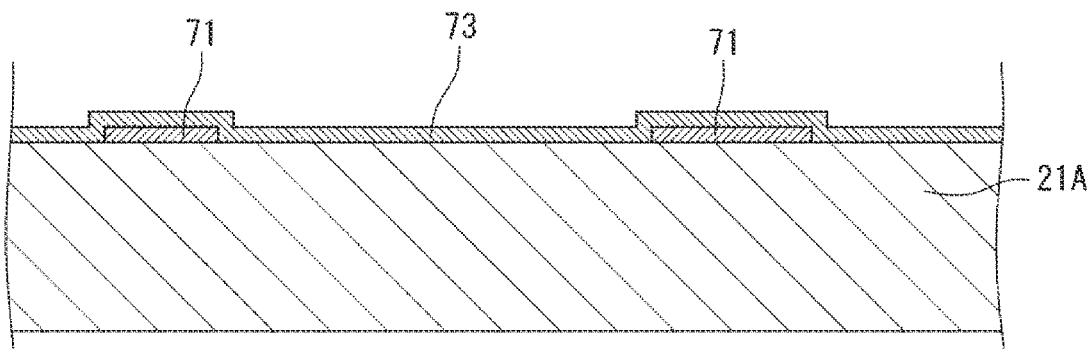
FIG. 7D is a schematic sectional view for explaining the method for manufacturing a passive component.

As illustrated in FIG. 7D, the dielectric film 73 is formed on the inorganic substrate 21A by the chemical vapor deposition (CVD) method or the like so as to cover the first capacitor electrode 71. For example, SiO 2 is used for the dielectric film 73, but SiN or the like may be used. Thus, a high dielectric constant can improve capacitance density of a capacitor. Further, when the same material, for example, Si is included in the dielectric film 73 and the inorganic substrate 21A, the material properties are close to each other and warpage, peeling, and the like can be suppressed.

Figure 7E:
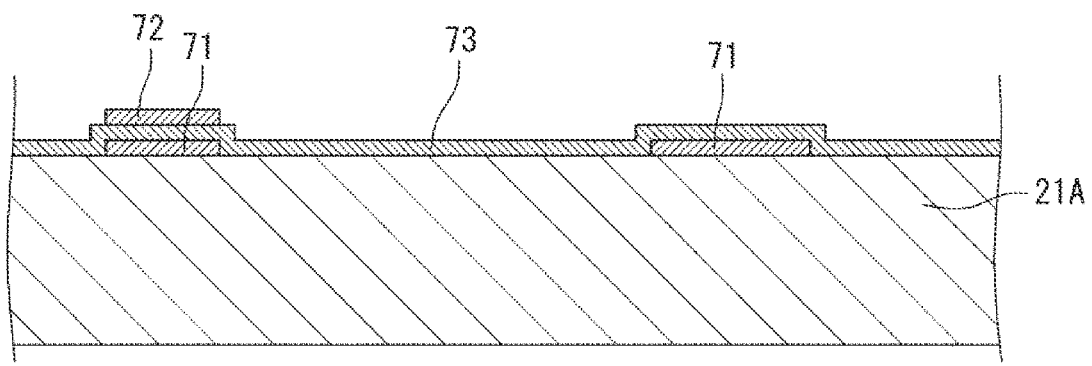
FIG. 7E is a schematic sectional view for explaining the method for manufacturing a passive component.

As illustrated in FIG. 7E, the second capacitor electrode 72 is formed on the dielectric film 73. The second capacitor electrode 72 is formed so as to overlap with the first capacitor electrode 71 when viewed in the Z direction. Specifically stated, the second capacitor electrode 72 is formed in the same manner as the formation of the first capacitor electrode 71.

Figure 7F:
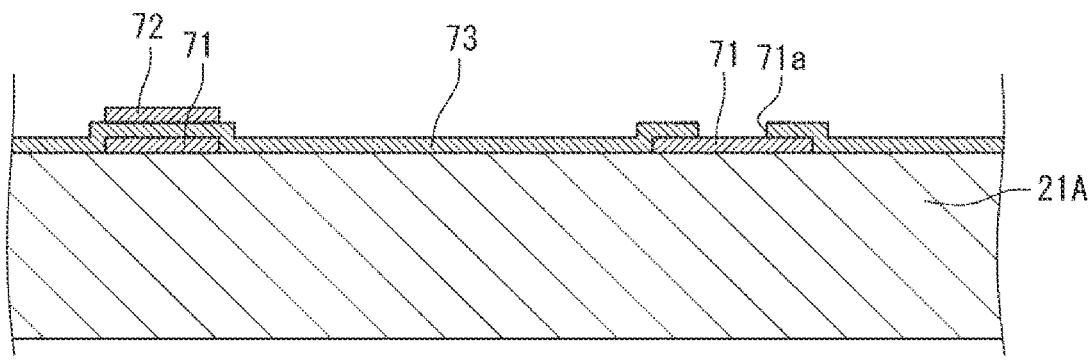
FIG. 7F is a schematic sectional view for explaining the method for manufacturing a passive component.

As illustrated in FIG. 7F, a resist layer, which is not shown, is applied and a predetermined pattern of cavities is formed in the resist layer by the photolithography process.

After that, the dielectric film 73 is etched so as to form the dielectric film 73 that is patterned. At this time, an opening 71a is formed on a position corresponding to a position on which the third via wiring 123v is to be formed.

Figure 7G:
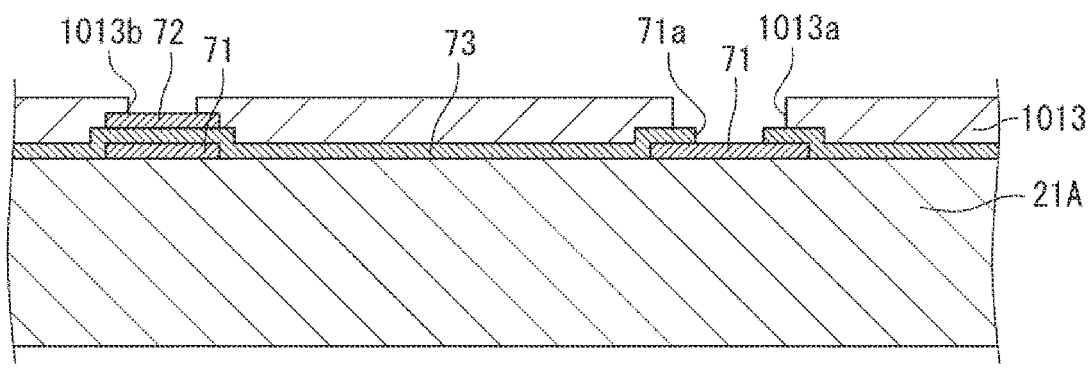
FIG. 7G is a schematic sectional view for explaining the method for manufacturing a passive component.

As illustrated in FIG. 7G, a third insulating layer 1013, which corresponds to part of the main body portion 10, is formed so as to cover the second capacitor electrode 72 and the dielectric film 73. A polyimide-based organic insulating film is used as the third insulating layer 1013, but an inorganic insulating layer, such as $SiO_2$ or SiN, may be used or an organic insulating film such as epoxy, phenol, and BCB may be used. Then, a resist layer, which is not shown, is applied and a predetermined pattern of cavities is formed in the resist layer by the photolithography process. After that, the third insulating layer 1013 is etched so as to form the third insulating layer 1013 that is patterned. At this time, an opening 1013a is formed on a position corresponding to a position on which the fourth via wiring 124v is to be formed, and an opening 1013b is formed on a position corresponding to a position on which the fifth via wiring 125v is to be formed.

Figure 7H:
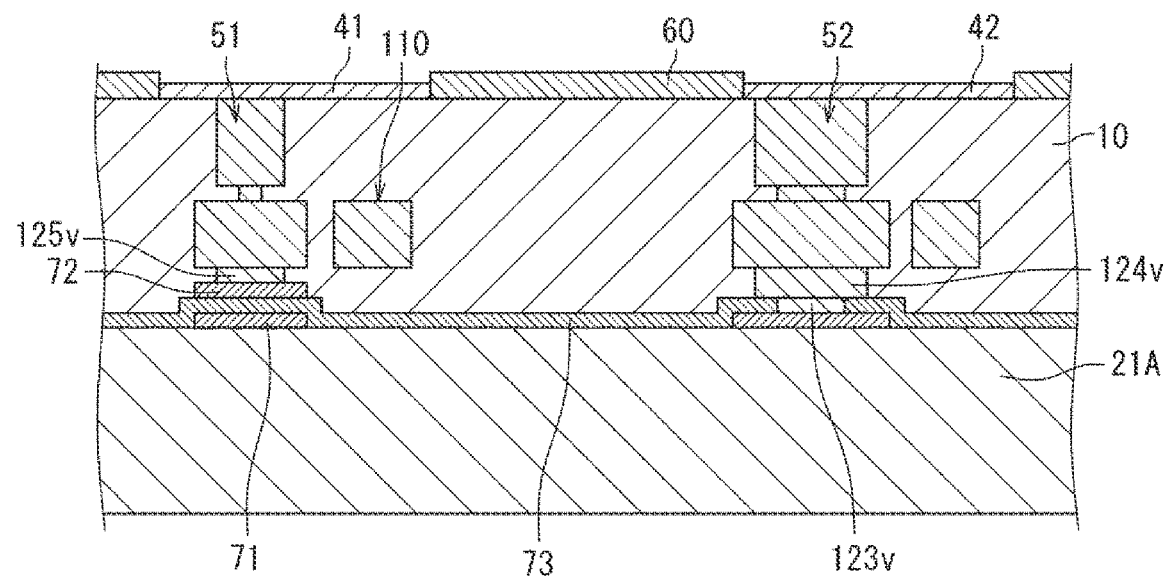
FIG. 7H is a schematic sectional view for explaining the method for manufacturing a passive component.

As illustrated in FIG. 7H, after the third via wiring 123v, the fourth via wiring 124v, and the fifth via wiring 125v are formed, the inductor wiring 110, the first extended wiring 51, the second extended wiring 52, the main body portion 10, the first external terminal 41, the second external terminal 42, and the coating film 60 are formed in the same manner as the manufacturing method of the first embodiment.

Figure 7I:
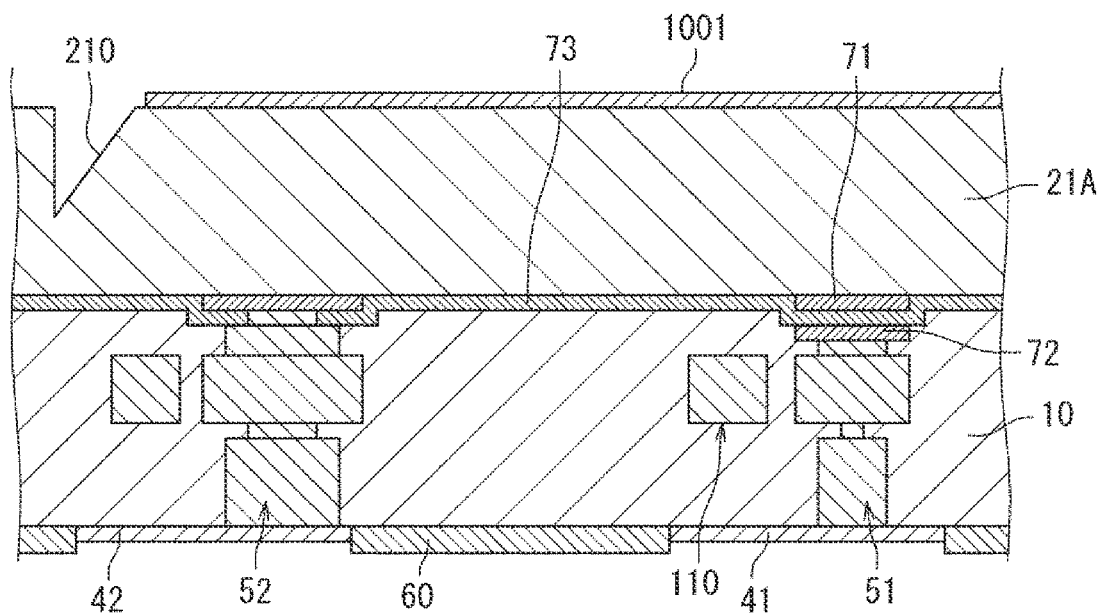
FIG. 7I is a schematic sectional view for explaining the method for manufacturing a passive component.

As illustrated in FIG. 7I, an adhesive member, which is not shown, is attached to the coating film 60 and the adhesive member is attached to a fixing table, which is not shown, so as to fix the main body portion 10 to the fixing table. After that, a protection film 1001, which is patterned, is formed on a lower surface (bottom surface) of the inorganic substrate 21A. The patterning of the protection film 1001 is performed by using a resist layer as the one described above. Then, etching or sandblasting is performed on the inorganic substrate 21A, which is exposed from the protection film 1001, so as to form a notch 210 on the lower surface side of the inorganic substrate 21A. The notch 210 constitutes the inclined surface 21e21 of the second end surface 21e2. The protection film 1001 is then peeled off.

Figure 7J:
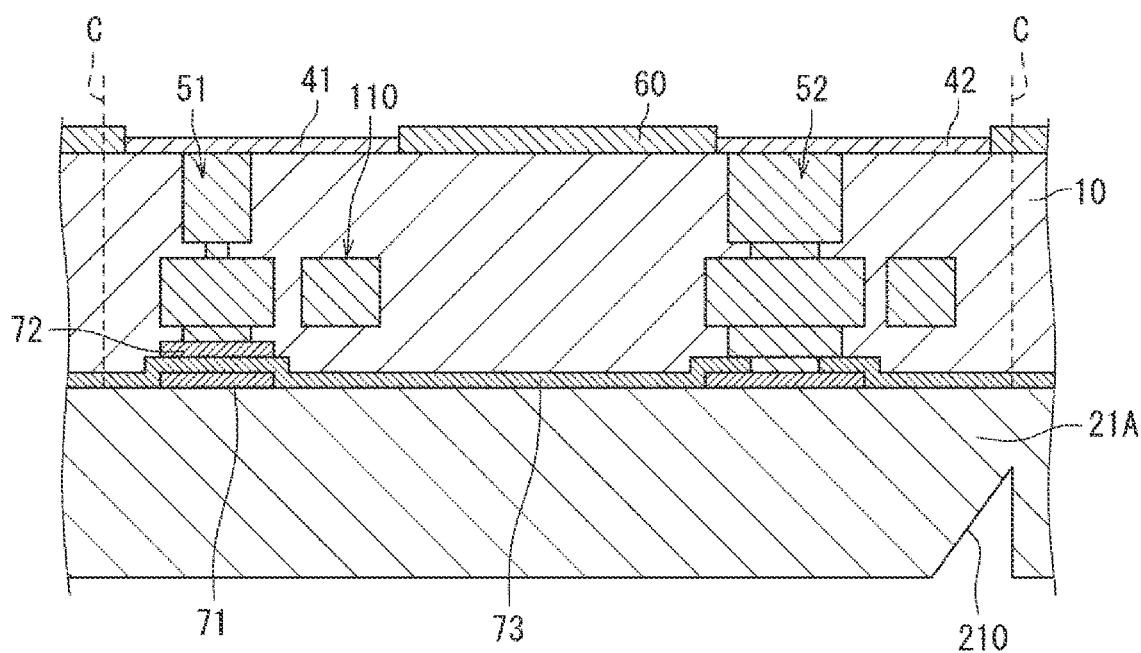
FIG. 7J is a schematic sectional view for explaining the method for manufacturing a passive component.
Figure 7K:
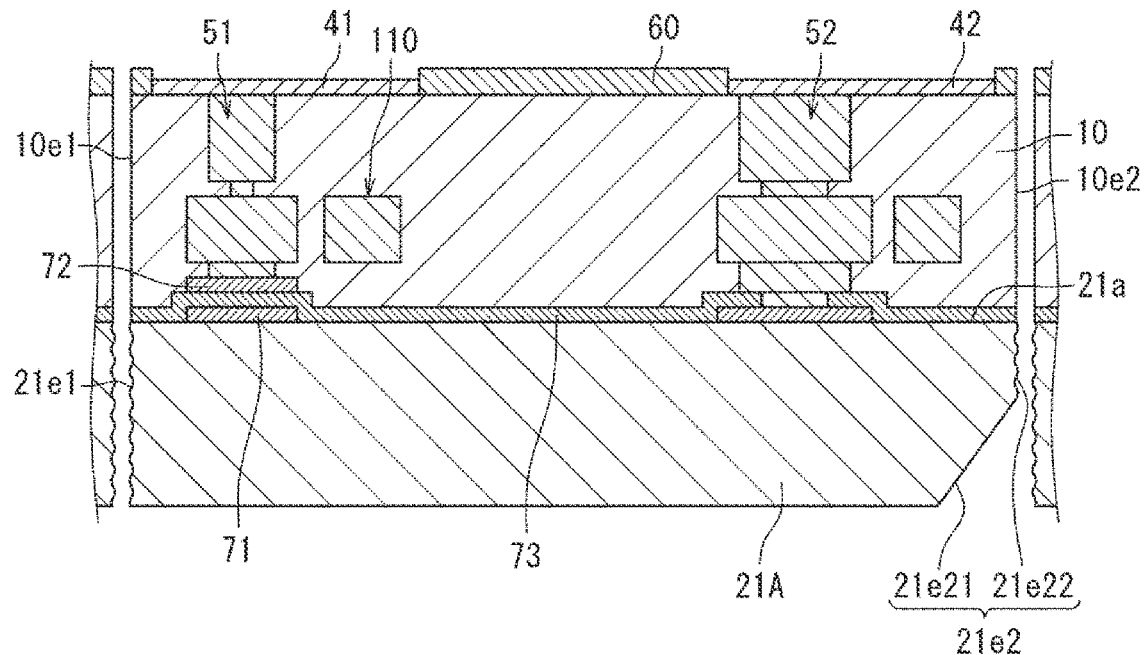
FIG. 7K is a schematic sectional view for explaining the method for manufacturing a passive component.

As illustrated in FIG. 7J, in the singulation process, the main body portion 10 is first cut at the cutting line C with a blade, but the inorganic substrate 21A is not cut by the blade. The first end surface 10e1 and the second end surface 10e2 of the main body portion 10 are thus formed. Subsequently, the inorganic substrate 21A is cut while vibrating the blade, as illustrated in FIG. 7K. Accordingly, the first end surface 21e1 and the vertical surface 21e22 of the second end surface 21e2 of the inorganic substrate 21A are formed.

This manufacturing method allows the line roughness of the first end surface 21e1 and the second end surface 21e2 of the inorganic substrate 21A to be larger than the line roughness of the first end surface 10e1 and the second end surface 10e2 of the main body portion 10 (the first end surface 5e1 and the second end surface 5e2 of the passive element portion 5A). In a similar manner, this method allows the line roughness of the first end surface 21e1 and the second end surface 21e2 of the inorganic substrate 21A to be larger than that of the top surface 21a of the inorganic substrate 21A.

Figure 7L:
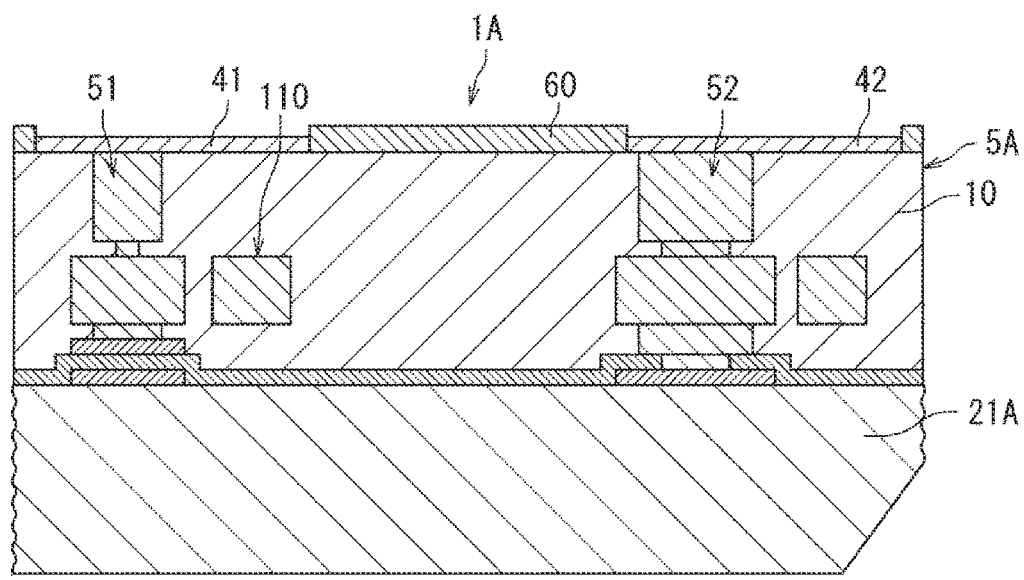
FIG. 7L is a schematic sectional view for explaining the method for manufacturing a passive component.

As illustrated in FIG. 7L, the adhesive member, which is not shown, is removed, manufacturing the passive component 1A.

First Modification

Figure 8:
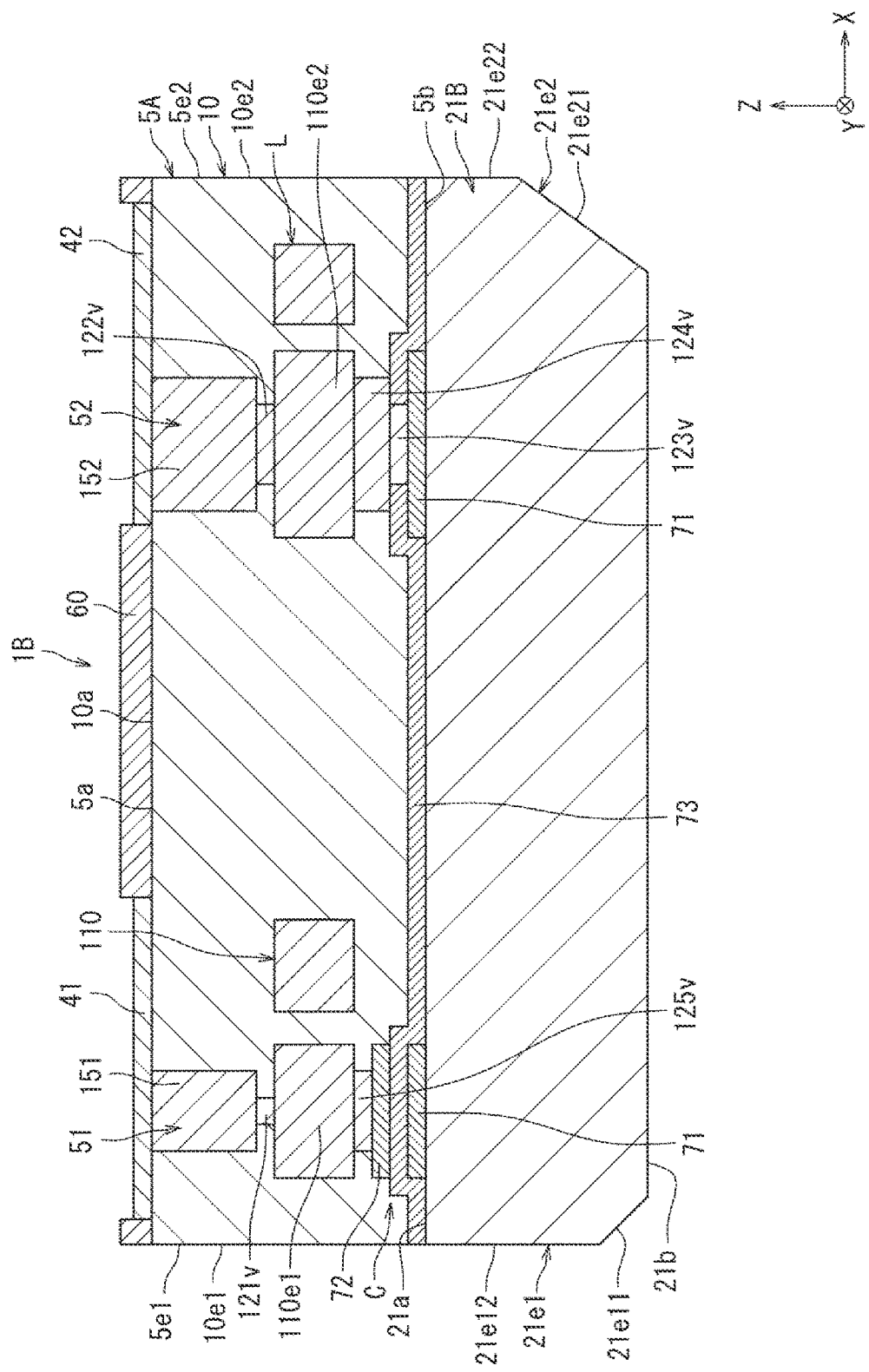
FIG. 8 is a schematic sectional view illustrating a passive component of a first modification of the second embodiment.

FIG. 8 is a sectional view illustrating a passive component of a first modification of the second embodiment. The first modification is different from the second embodiment (FIG. 6) in the shape of an inorganic substrate. The different structure will be described below. Other structures are the same as the structures of the second embodiment and will be provided with the same reference characters as those of the second embodiment and the description thereof will be omitted.

As illustrated in FIG. 8, in a passive component 1B of the first modification, the first end surface 21e1 of an inorganic substrate 21B has an inclined surface 21e11 and a vertical surface 21e12. The inclined surface 21e11 is inclined in a direction orthogonal to the top surface 21a and is connected to the bottom surface 21b. The vertical surface 21e12 extends in the direction orthogonal to the top surface 21a and is connected to the top surface 21a. The inclined surface 21e11 is connected between the vertical surface 21e12 and the bottom surface 21b. The inclined surface 21e11 is formed so as to be inclined from the top surface 21a to the bottom surface 21b in a direction approaching the second end surface 21e2. Accordingly, a corner portion on the bottom surface 21b side of the inorganic substrate 21B is chamfered and chipping of the inorganic substrate 21B can be prevented.

The inclined surface 21e11 of the first end surface 21e1 is smaller than the inclined surface 21e21 of the second end surface 21e2 in each of the length along the inclined surface, the length along the X direction, and the length along the Z direction. This structure can more clearly impart directionality to the inorganic substrate 21B.

The unevenness on the surface of the inclined surface 21e11 of the first end surface 21e1, the unevenness on the surface of the vertical surface 21e12 of the first end surface 21e1, and the unevenness on the surface of the vertical surface 21e22 of the second end surface 21e2 are each small, unlike the second embodiment, and have the same size as the unevenness on the surface of the inclined surface 21e21 of the second end surface 21e2.

Each of the line roughness of the first end surface 21e1 and the line roughness of the second end surface 21e2 is larger than the line roughness of the top surface 21a, as is the case with the second embodiment. Further, the line roughness of the first end surface 21e1 and the line roughness of the second end surface 21e2 are different from each other. The line roughness of the first end surface 21e1 is smaller than the line roughness of the second end surface 21e2 in the first modification.

Second Modification

Figure 9:
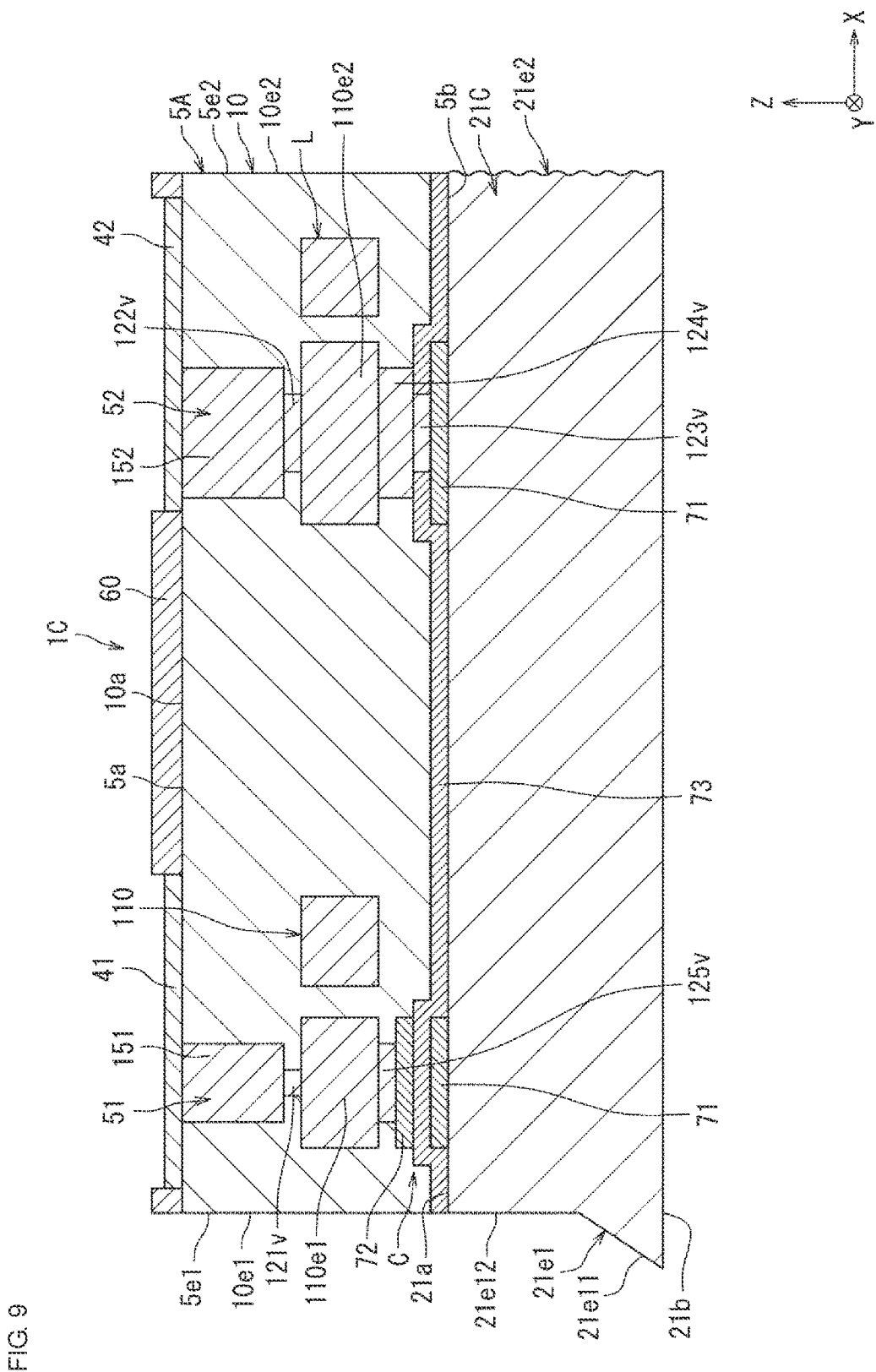
FIG. 9 is a schematic sectional view illustrating a passive component of a second modification of the second embodiment.

FIG. 9 is a sectional view illustrating a passive component of a second modification of the second embodiment. The second modification is different from the second embodiment (FIG. 6) in the shape of an inorganic substrate. The different structure will be described below. Other structures are the same as the structures of the second embodiment and will be provided with the same reference characters as those of the second embodiment and the description thereof will be omitted.

As illustrated in FIG. 9, in a passive component 1C of the second modification, the first end surface 21e1 of an inorganic substrate 21C has the inclined surface 21e11 and the vertical surface 21e12. The inclined surface 21e11 is inclined in the direction orthogonal to the top surface 21a and is connected to the bottom surface 21b. The vertical surface 21e12 extends in the direction orthogonal to the top surface 21a and is connected to the top surface 21a. The inclined surface 21e11 is connected between the vertical surface 21e12 and the bottom surface 21b. The inclined surface 21e11 is formed so as to be inclined from the top surface 21a to the bottom surface 21b in a direction away from the second end surface 21e2. Accordingly, a corner portion on the bottom surface 21b side of the inorganic substrate 21C protrudes and the inorganic substrate 21C can be easily gripped.

On the other hand, the second end surface 21e2 is a vertical surface, which extends in the direction orthogonal to the top surface 21a. This structure can more clearly impart directionality to the inorganic substrate 21C.

Each of the unevenness on the surface of the inclined surface 21e11 of the first end surface 21e1 and the unevenness on the surface of the vertical surface 21e12 of the first end surface 21e1 is small, unlike the first end surface 21e1 of the second embodiment, and is smaller than the unevenness on the surface of the second end surface 21e2.

Each of the line roughness of the first end surface 21e1 and the line roughness of the second end surface 21e2 is larger than the line roughness of the top surface 21a, as is the case with the second embodiment. Further, the line roughness of the first end surface 21e1 and the line roughness of the second end surface 21e2 are different from each other. The line roughness of the first end surface 21e1 is larger than the line roughness of the second end surface 21e2 in the second modification.

Third Embodiment

Figure 10:
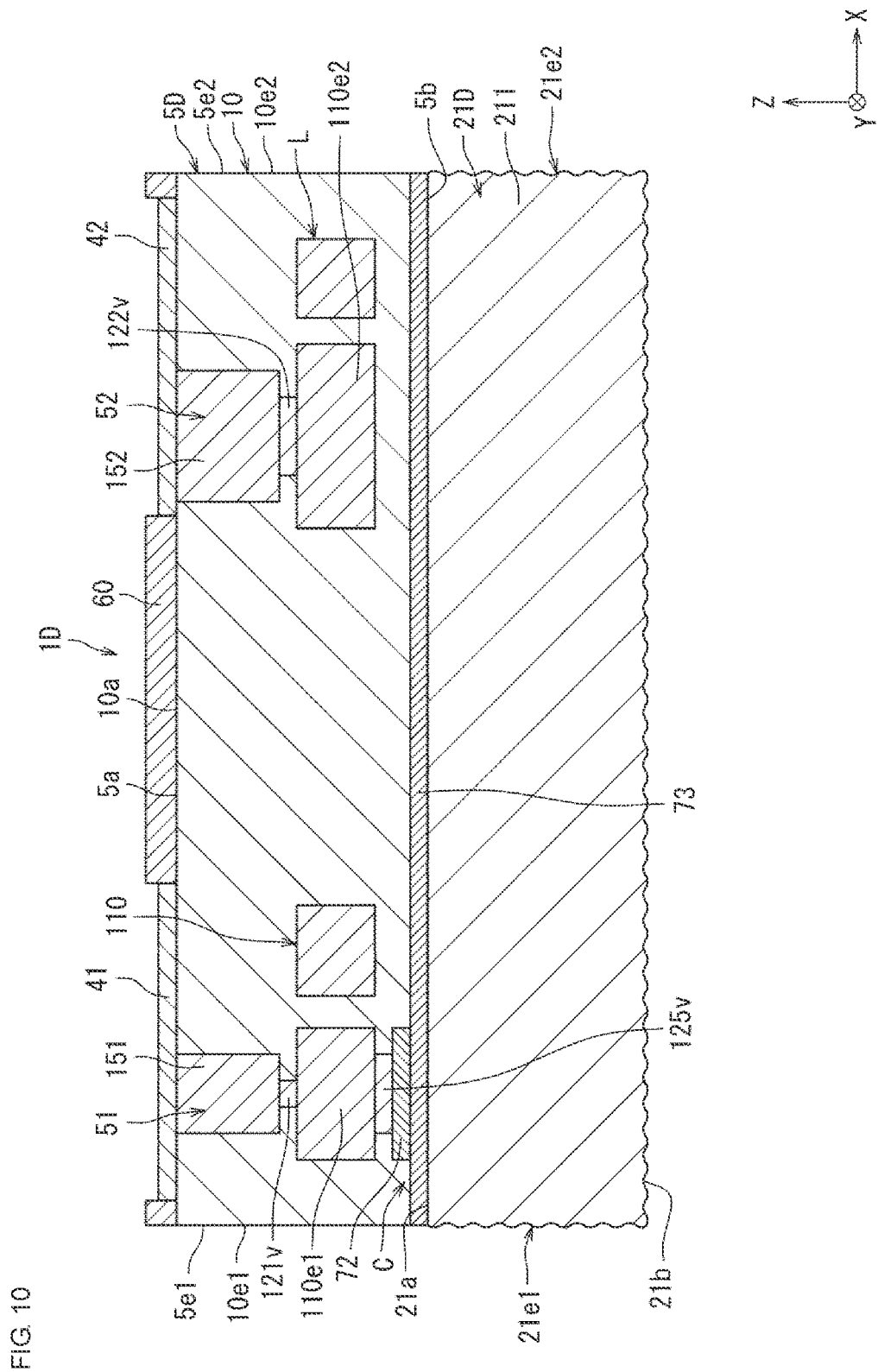
FIG. 10 is a schematic sectional view illustrating a passive component of a third embodiment.

FIG. 10 is a sectional view illustrating a passive component of a third embodiment. The third embodiment is mainly different from the second embodiment in the structure of a passive element portion and the shape of an inorganic substrate. The different structures will be described below. Other structures are the same as the structures of the second embodiment and will be provided with the same reference characters as those of the second embodiment and the description thereof will be omitted.

As illustrated in FIG. 10, in a passive component 1D of the third embodiment, a passive element portion 5D includes the inductor element L and part of the capacitor element C. The part of the capacitor element C does not include the first capacitor electrode 71 but includes the second capacitor electrode 72 and the dielectric film 73. That is, the first capacitor electrode 71 is not present on the top surface 21a of an inorganic substrate 21D and the top surface 21a of the inorganic substrate 21D is in contact with the dielectric film 73.

The inorganic substrate 21D includes a low resistance portion 211 having lower electrical resistance than a semiconductor made of a semiconductor material. The low resistance portion 211 is electrically connected with the passive element portion 5D. Accordingly, the low resistance portion 211 can be used as a conductor and the degree of design freedom is increased.

The low resistance portion 211 corresponds to the first capacitor electrode 71 of the capacitor element C, in the third embodiment. The low resistance portion 211 serving as the first capacitor electrode 71 is not connected with the inner circumferential end 110e2 of the inductor wiring 110 of the inductor element L, unlike the second embodiment.

The low resistance portion 211 has lower electrical resistance than semiconductors made of semiconductor materials, such as Si, GaAs, SiC, GaN, InP, and ITO. In the third embodiment, the whole of the inorganic substrate 21D is the low resistance portion 211. Accordingly, the electrical resistance of the passive component 1D can be lowered.

When the inorganic substrate 21D contains, for example, Si as a semiconductor material, the low resistance portion 211 is Si doped with P or B. When the inorganic substrate 21D contains, for example, GaAs as a semiconductor material, the low resistance portion 211 is GaAs doped with Si, Sn, S, Se, Te, Be, Zn, and Ge.

"Low resistance" means that electrical resistivity is $10^{-1}$ $\Omega \cdot cm$ or less. This ensures that the electrical resistance of the low resistance portion 211 is sufficiently low to allow most of current to flow through the low resistance portion 211. For example, when the inorganic substrate 21D is a Si substrate, the electrical resistivity of the Si substrate is approximately $10^3$ $\Omega \cdot cm$. If the electrical resistivity of the low resistance portion 211 is $1/1000$ times or less than the electrical resistivity of a portion of the inorganic substrate 21D other than the low resistance portion 211, most of current is allowed to flow through the low resistance portion 211. Therefore, the electrical resistivity of the low resistance portion 211 is set to $10^{-1}$ $\Omega \cdot cm$ or less. The electrical resistivity of the low resistance portion 211 can be calculated as follows, for example. Measurement probes are first brought into contact with both respective ends of the low resistance portion 211 so as to measure DC electrical resistance by the four-terminal method. Then, the measured electrical resistance is multiplied by the cross-sectional area of the low resistance portion 211, for example, the cross-sectional area of Si doped with phosphorus or boron, and divided by the length between both ends of the low resistance portion 211, thereby being able to measure the electrical resistivity. Here, the doped cross-sectional area can be calculated by exposing a cross section across the low resistance portion 211 and performing elemental mapping by energy dispersive X-ray analysis (EDX). Specifically stated, in the elemental mapping, an area up to a region that is 30% of the peak value of the doped amount may be taken as the doped cross-sectional area.

The low resistance portion 211 can be obtained by doping the inorganic substrate 21D with impurities to form a high-concentration impurity region (in other words, a doped layer). That is, the low resistance portion 211 contains a semiconductor material, which is contained in the inorganic substrate 21D, has electrical resistivity which is lower than that of semiconductors made of semiconductor materials, and is integrated with the inorganic substrate 21D. When the inorganic substrate 21D is a Si substrate, it is preferable to perform group III or group V impurity doping at approximately $1 \times 10^{20}/cm^3$. As a result, the electrical resistivity of the low resistance portion 211 is approximately $10^{-3}$ $\Omega \cdot cm$ when doped with phosphorus, which is a group V impurity, and is approximately $5 \times 10^{-3}$ $\Omega \cdot cm$ when doped with boron, which is a group III impurity.

On the inorganic substrate 21D, the first end surface 21e1 and the second end surface 21e2 are vertical surfaces, which extend in the direction orthogonal to the top surface 21a. Each of the line roughness of the first end surface 21e1 and the line roughness of the second end surface 21e2 is larger than the line roughness of the top surface 21a, as is the case with the second embodiment. Further, the line roughness of the bottom surface 21b is larger than the line roughness of the top surface 21a. The thickness of the inorganic substrate 21D can be adjusted by grinding the bottom surface 21b. In FIG. 10, the unevenness on the surface of the first end surface 21e1, the unevenness on the surface of the second end surface 21e2, and the unevenness on the surface of the bottom surface 21b are largely drawn for ease of understanding.

The low resistance portion is the first capacitor electrode of the capacitor element in the third embodiment, but the low resistance portion may be lead wiring that connects an inductor element and a capacitor element, which are arranged in parallel on an inorganic substrate. Further, when an inductor element includes a plurality pieces of inductor wiring, the low resistance portion may be single inductor wiring. The low resistance portion is provided on the whole of the inorganic substrate in the third embodiment, but the low resistance portion may be provided on part of the inorganic substrate.

Fourth Embodiment

Figure 11:
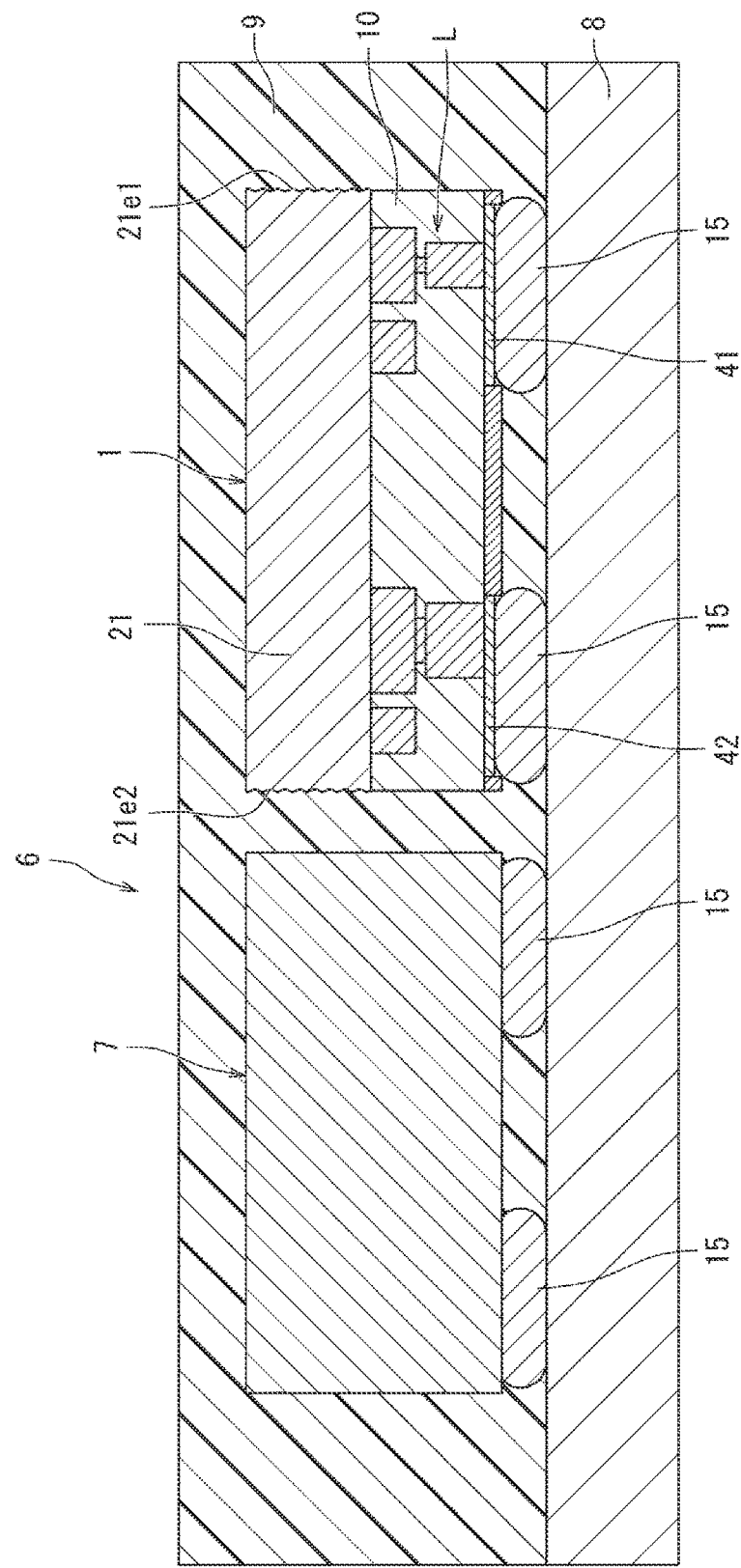
FIG. 11 is a schematic sectional view illustrating a package component.

FIG. 11 is a sectional view illustrating a package component of an embodiment. As illustrated in FIG. 11, a package component 6 includes a mounting substrate 8, the passive component 1, which is arranged on the mounting substrate 8, an electronic component 7, which is arranged on the mounting substrate 8, and a sealing member 9, which is provided on the mounting substrate 8 and covers the passive component 1 and the electronic component 7.

The passive component 1 is the passive component described in the first embodiment, but may be the passive component described in the second embodiment, the first modification, the second modification, or the third embodiment. The sealing member 9 is in contact with the first end surface 21e1 and the second end surface 21e2 of the inorganic substrate 21 in the passive component 1.

The mounting substrate 8 is, for example, an inorganic substrate made of Si or $SiO_2$ (so-called silicon interposer substrate or glass interposer substrate), or an organic substrate made of flame retardant type 4 (FR4), epoxy, polyimide, or the like (so-called organic package substrate). Pieces of wiring are provided in the inside or on a main surface of the mounting substrate 8 and are electrically connected with the passive component 1 and the electronic component 7. On the main surface of the mounting substrate 8, conductive members such as an external terminal, a conductor bump, a conductor pillar, and solder may be provided.

The passive component 1 and the electronic component 7 are connected with the main surface of the mounting substrate 8 with solder 15 interposed therebetween. That is, the first external terminal 41 and the second external terminal 42 of the passive component 1 are connected with the mounting substrate 8 with the solder 15 interposed therebetween. The electronic component 7 is, for example, another passive component, an integrated circuit component, or a sensor component. The electronic component 7 may be omitted. The sealing member 9 is, for example, mold resin. The mold resin is composed of, for example, thermosetting epoxy resin.

According to the above-mentioned structure, the passive component 1 is covered by the sealing member 9, thereby improving reliability. Further, since the sealing member 9 is in contact with the first end surface 21e1 and the second end surface 21e2 having large line roughness, the close contact property between the sealing member 9 and the passive component 1 is improved.

It should be noted that the present disclosure is not limited to the embodiments described above and design change can be made without departing from the gist of the present disclosure. For example, characteristic points of the first to fourth embodiments may be combined in various ways. In the above-described embodiments, the inductor element includes a single layer of planar spiral inductor wiring. However, the inductor element may have multiple layers of planar spiral inductor wiring. The passive element portion includes at least one of the inductor element and the capacitor element in the above-described embodiments. However, the passive element portion may include any one or more selected from the group consisting of an inductor element, a capacitor element, and a resistor.

First Example

An example in which the line roughness of the passive component 1 of the first embodiment was measured will next be described.

The passive component 1 was polished to expose a cross section in a plane that passes through the center of the passive component 1 in the Y direction, which is the width direction, and is orthogonal to the top surface 21a, as illustrated in FIG. 2, and images of measurement points were acquired. In the present example, images were acquired at magnifications of 350 times and 1000 times with a microscope, a scanning electron microscope (SEM), or the like. Any measurement magnification may be employed as long as the magnification fits most of measurement points.

The acquired images were read into measurement software (WinROOF2018). Specifically, when the first end surface 21e1 and the second end surface 21e2 of the inorganic substrate 21 were measured, most of an area to be measured (80% or more of the total length of each end surface) in the acquired images was designated as the measurement area.

Then, line roughness (LER) compliant with SEMI standards was measured. In WinRoof2018, edges of a line were detected, an approximate straight line was calculated, and the deviation amount between the approximate straight line and an actual edge was defined as roughness. The top surface 21a and the bottom surface 21b of the inorganic substrate 21 and the first end surface 5e1 and the second end surface 5e2 of the main body portion 10 were similarly measured. In the present example, the line roughness means an average value.

Table 1 shows measured values of line roughness of each of the first end surface 21e1, the second end surface 21e2, the top surface 21a, and the bottom surface 21b of the inorganic substrate 21 and line roughness of the first end surface 5e1 and the second end surface 5e2 of the main body portion 10. "Range" means a width between the maximum value and the minimum value of line roughness. "σ" denotes variation in line roughness.

TABLE 1

| Measurement point | Magnification | Line roughness [μm] | Range [μm] | σ [μm] |
|---|---|---|---|---|
| First end surface of inorganic substrate | 350 times | 1.025 | 2.895 | 0.840 |
|  | 1000 times | 1.197 | 2.991 | 0.785 |
| Second end surface of inorganic substrate | 350 times | 0.484 | 2.632 | 0.396 |
|  | 1000 times | 0.286 | 1.308 | 0.215 |
| First end surface of main body portion | 350 times | 0.256 | 0.526 | 0.165 |
|  | 1000 times | 0.140 | 0.561 | 0.116 |
| Second end surface of main body portion | 350 times | 0.118 | 0.263 | 0.131 |
|  | 1000 times | 0.062 | 0.280 | 0.062 |
| Top surface of inorganic substrate | 1000 times | 0.084 | 0.280 | 0.073 |
| Bottom surface of inorganic substrate | 1000 times | 0.430 | 1.682 | 0.368 |

As shown in Table 1, the line roughness of each of the first end surface and the second end surface of the inorganic substrate is larger than the line roughness of the top surface of the inorganic substrate. Further, the line roughness of each of the first end surface and the second end surface of the main body portion is smaller than the line roughness of the first end surface and the second end surface of the inorganic substrate. The line roughness of the top surface of the inorganic substrate is 0.5 μm or less, and the line roughness of each of the first end surface and the second end surface of the inorganic substrate is from 0.2 μm to 10 μm inclusive. The line roughness of the top surface of the inorganic substrate is smaller than the line roughness of the bottom surface of the inorganic substrate.

Second Example

An example in which the line roughness of the passive component 1A of the second embodiment was measured will next be described.

The passive component 1A was polished to expose a cross section in a plane that passes through the center of the passive component 1A in the Y direction, which is the width direction, and is orthogonal to the top surface 21a, as illustrated in FIG. 6, and images of measurement points were acquired. The line roughness of each of the first end surface 21e1 and the second end surface 21e2 of the inorganic substrate 21A was measured by the same method as the first example.

Table 2 shows measured values of the line roughness of each of the first end surface 21e1 and the second end surface 21e2 of the inorganic substrate 21A. "Range" means a width between the maximum value and the minimum value of line roughness. "σ" denotes variation in line roughness.

TABLE 2

| Measurement point | Magnification | Line roughness [μm] | Range [μm] | σ [μm] |
|---|---|---|---|---|
| First end surface of inorganic substrate | 350 times | 0.196 | 0.375 | 0.187 |
| Second end surface of inorganic substrate | 350 times | 5.901 | 17.228 | 3.940 |

As shown in Table 2, the line roughness of the first end surface 21e1 of the inorganic substrate 21A and the line roughness of the second end surface 21e2 of the inorganic substrate 21A are different from each other. The line roughness of the second end surface 21e2 is larger than the line roughness of the first end surface 21e1. The difference between the line roughness of the first end surface 21e1 and the line roughness of the second end surface 21e2 is approximately five times.

The present disclosure includes the following aspects.

<1> A passive component including an inorganic substrate that has a first main surface and a second main surface, the first main surface and the second main surface being opposed to each other, and contains a semiconductor material; and a passive element portion that is provided on the first main surface of the inorganic substrate so as to be in contact with the first main surface. When a cross section in a plane that passes through a center of gravity in a whole of the first main surface and is orthogonal to the first main surface is defined as a first cross section, in the first cross section, the inorganic substrate has a first side surface and a second side surface, the first side surface and the second side surface being connected with the first main surface and being opposed to each other, and each of line roughness of the first side surface and line roughness of the second side surface is larger than line roughness of the first main surface.

<2> The passive component according to <1>, in which line roughness of the second main surface is smaller than the line roughness of the first side surface and the line roughness of the second side surface in the first cross section.

<3> The passive component according to <1> or <2>, in which the passive element portion includes a capacitor element and an inductor element, and the capacitor element is provided on the first main surface of the inorganic substrate and the inductor element is provided above the capacitor element.

<4> The passive component according to any one of <1> to <3>, in which in the first cross section, the passive element portion includes a third main surface, the third main surface being in contact with the first main surface, and a third side surface and a fourth side surface, the third side surface and the fourth side surface being connected with the third main surface and being opposed to each other, and each of line roughness of the third side surface and line roughness of the fourth side surface is smaller than the line roughness of the first side surface and the line roughness of the second side surface.

<5> The passive component according to <4>, in which the passive element portion includes an inductor element and a main body portion, the main body portion being made of organic resin, and the main body portion has the third side surface and the fourth side surface.

<6> The passive component according to any one of <1> to <5>, in which the line roughness of the first side surface and the line roughness of the second side surface are different from each other.

<7> The passive component according to any one of <1> to <6>, in which the second side surface has an inclined surface, the inclined surface being inclined in a direction orthogonal to the first main surface and being connected with the second main surface, on a portion thereof.

<8> The passive component according to <7>, in which the second side surface further has a vertical surface, the vertical surface extending in the direction orthogonal to the first main surface and being connected with the first main surface, and the inclined surface is connected between the vertical surface and the second main surface.

<9> The passive component according to <7> or <8>, in which the inclined surface is formed so as to be inclined from the first main surface to the second main surface in a direction approaching the first side surface.

<10> The passive component according to any one of <1> to <9>, in which the passive element portion includes at least part of a capacitor element, and at least part of the capacitor element includes a capacitor electrode, the capacitor electrode extending in a direction parallel to the first main surface, and a dielectric film, the dielectric film being arranged between the capacitor electrode and the inorganic substrate and containing at least one chemical element of the inorganic substrate.

<11> The passive component according to any one of <1> to <10>, in which the inorganic substrate includes a low resistance portion having lower electrical resistance than a semiconductor made of the semiconductor material, and the low resistance portion is electrically connected with the passive element portion.

<12> The passive component according to any one of <1> to <11>, in which the passive element portion includes a main body portion, the main body portion being made of organic resin, the main body portion has a third main surface, the third main surface being in contact with the first main surface, and a fourth main surface, the fourth main surface being opposed to the third main surface, and line roughness of the fourth main surface is smaller than the line roughness of the first side surface and the line roughness of the second side surface.

<13> The passive component according to any one of <1> to <12>, in which the line roughness of the first main surface is 0.5 μm or less, and each of the line roughness of the first side surface and the line roughness of the second side surface is from 0.2 μm to 10 μm inclusive.

<14> The passive component according to any one of <1> to <13>, in which the line roughness of the first main surface is larger than the line roughness of the second main surface.

<15> The passive component according to any one of <1> to <13>, in which the line roughness of the first main surface is smaller than the line roughness of the second main surface.

<16> The passive component according to any one of <1> to <15>, in which the passive element portion includes a main body portion, the main body portion being made of organic resin, and the main body portion has lower thickness than thickness of the inorganic substrate.

<17> A package component including a mounting substrate; the passive component according to any one of <1> to <16>, the passive component being arranged on the mounting substrate; and a sealing member, the sealing member provided on the mounting substrate and covering the passive component. The sealing member is in contact with the first side surface and the second side surface of the inorganic substrate in the passive component.

What is claimed is:

1. A passive component comprising:
an inorganic substrate that has a first main surface and a second main surface, the first main surface and the second main surface being opposed to each other, and the inorganic substrate includes a semiconductor material; and
a passive element portion that is on the first main surface of the inorganic substrate so as to be in contact with the first main surface, wherein
when a cross section in a plane that passes through a center of gravity in a whole of the first main surface and is orthogonal to the first main surface is defined as a first cross section,
in the first cross section,
the inorganic substrate has a first side surface and a second side surface, the first side surface and the second side surface being connected with the first main surface and being opposed to each other, and each of line roughness of the first side surface and line roughness of the second side surface is larger than line roughness of the first main surface; and
the second side surface has an inclined surface, the inclined surface being inclined in a direction orthogonal to the first main surface and being connected with the second main surface, on a portion thereof.

2. The passive component according to claim 1, wherein line roughness of the second main surface is smaller than the line roughness of the first side surface and the line roughness of the second side surface in the first cross section.

3. The passive component according to claim 2, wherein the passive element portion includes a capacitor element and an inductor element, and the capacitor element is on the first main surface of the inorganic substrate and the inductor element is above the capacitor element.

4. The passive component according to claim 2, wherein in the first cross section,
the passive element portion includes a third main surface, the third main surface being in contact with the first main surface, and a third side surface and a fourth side surface, the third side surface and the fourth side surface being connected with the third main surface and being opposed to each other, and
each of line roughness of the third side surface and line roughness of the fourth side surface is smaller than the line roughness of the first side surface and the line roughness of the second side surface.

5. The passive component according to claim 2, wherein the line roughness of the first side surface and the line roughness of the second side surface are different from each other.

6. The passive component according to claim 1, wherein the passive element portion includes a capacitor element and an inductor element, and
the capacitor element is on the first main surface of the inorganic substrate and the inductor element is above the capacitor element.

7. The passive component according to claim 1, wherein in the first cross section,
the passive element portion includes a third main surface, the third main surface being in contact with the first main surface, and a third side surface and a fourth side surface, the third side surface and the fourth side surface being connected with the third main surface and being opposed to each other, and
each of line roughness of the third side surface and line roughness of the fourth side surface is smaller than the line roughness of the first side surface and the line roughness of the second side surface.

8. The passive component according to claim 7, wherein the passive element portion includes an inductor element and a main body portion, the main body portion being made of organic resin, and
the main body portion has the third side surface and the fourth side surface.

9. The passive component according to claim 1, wherein the line roughness of the first side surface and the line roughness of the second side surface are different from each other.

10. The passive component according to claim 1, wherein the second side surface further has a vertical surface, the vertical surface extending in the direction orthogonal to the first main surface and being connected with the first main surface, and the inclined surface is connected between the vertical surface and the second main surface.

11. The passive component according to claim 1, wherein the inclined surface is inclined from the first main surface to the second main surface in a direction approaching the first side surface.

12. The passive component according to claim 1, wherein the passive element portion includes at least part of a capacitor element, and
at least part of the capacitor element includes a capacitor electrode, the capacitor electrode extending in a direction parallel to the first main surface, and a dielectric film, the dielectric film being arranged between the capacitor electrode and the inorganic substrate and including at least one chemical element of the inorganic substrate.

13. The passive component according to claim 1, wherein the inorganic substrate includes a low resistance portion having lower electrical resistance than a semiconductor made of the semiconductor material, and the low resistance portion is electrically connected with the passive element portion.

14. The passive component according to claim 1, wherein the passive element portion includes a main body portion, the main body portion being made of organic resin,
the main body portion has a third main surface, the third main surface being in contact with the first main surface, and a fourth main surface, the fourth main surface being opposed to the third main surface, and
line roughness of the fourth main surface is smaller than the line roughness of the first side surface and the line roughness of the second side surface.

15. The passive component according to claim 1, wherein the line roughness of the first main surface is 0.5 μm or less, and
each of the line roughness of the first side surface and the line roughness of the second side surface is from 0.2 μm to 10 μm inclusive.

16. The passive component according to claim 1, wherein the line roughness of the first main surface is larger than the line roughness of the second main surface.

17. The passive component according to claim 1, wherein the line roughness of the first main surface is smaller than the line roughness of the second main surface.

18. The passive component according to claim 1, wherein the passive element portion includes a main body portion, the main body portion being made of organic resin, and the main body portion has lower thickness than thickness of the inorganic substrate.

19. A package component comprising:
a mounting substrate;
a passive component the mounting substrate, the passive component comprising:
an inorganic substrate that has a first main surface and a second main surface, the first main surface and the second main surface being opposed to each other, and the inorganic substrate includes a semiconductor material; and
a passive element portion that is on the first main surface of the inorganic substrate so as to be in contact with the first main surface, wherein
when a cross section in a plane that passes through a center of gravity in a whole of the first main surface and is orthogonal to the first main surface is defined as a first cross section,
in the first cross section,
the inorganic substrate has a first side surface and a second side surface, the first side surface and the second side surface being connected with the first main surface and being opposed to each other, and each of line roughness of the first side surface and line roughness of the second side surface is larger than line roughness of the first main surface; and
a sealing member on the mounting substrate and covering the passive component, wherein
the sealing member is made of mold resin and is in contact with the first side surface and the second side surface of the inorganic substrate in the passive component.

* * * * *